Nov. 9, 1948.　　　B. HERTZ　　　2,453,436
FLIGHT TRAINING APPARATUS
Filed March 9, 1943　　　9 Sheets-Sheet 1
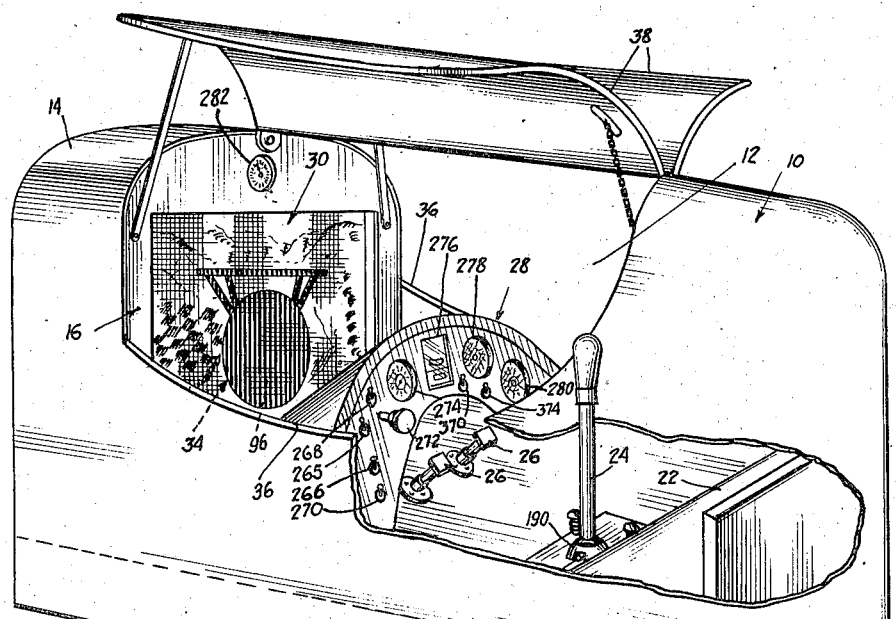
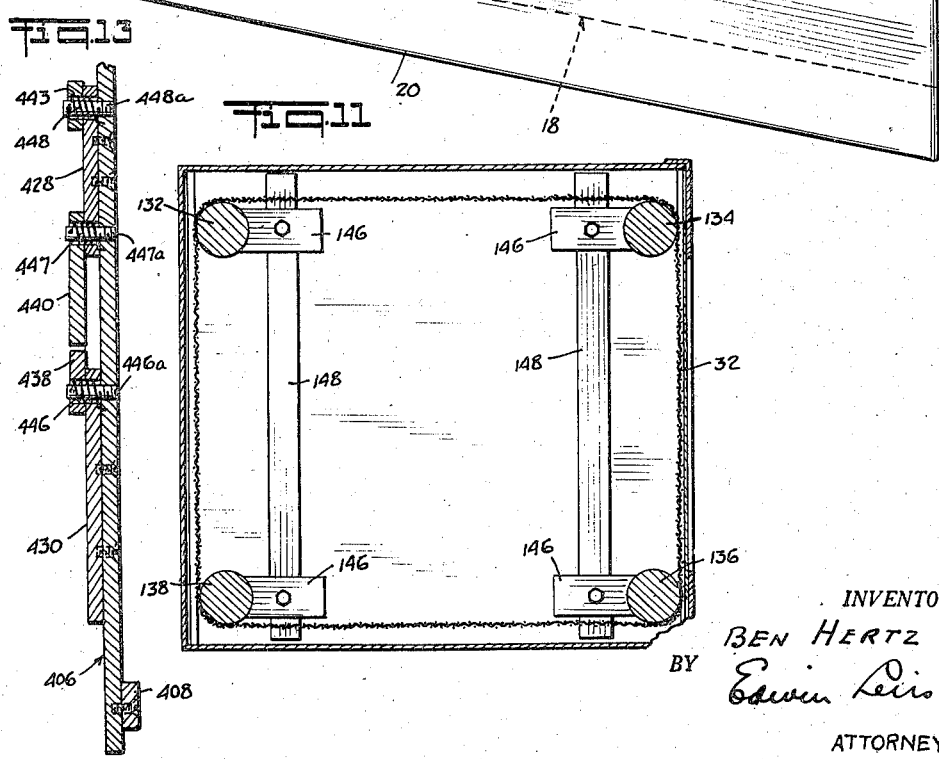
INVENTOR.
BEN HERTZ
BY
ATTORNEY

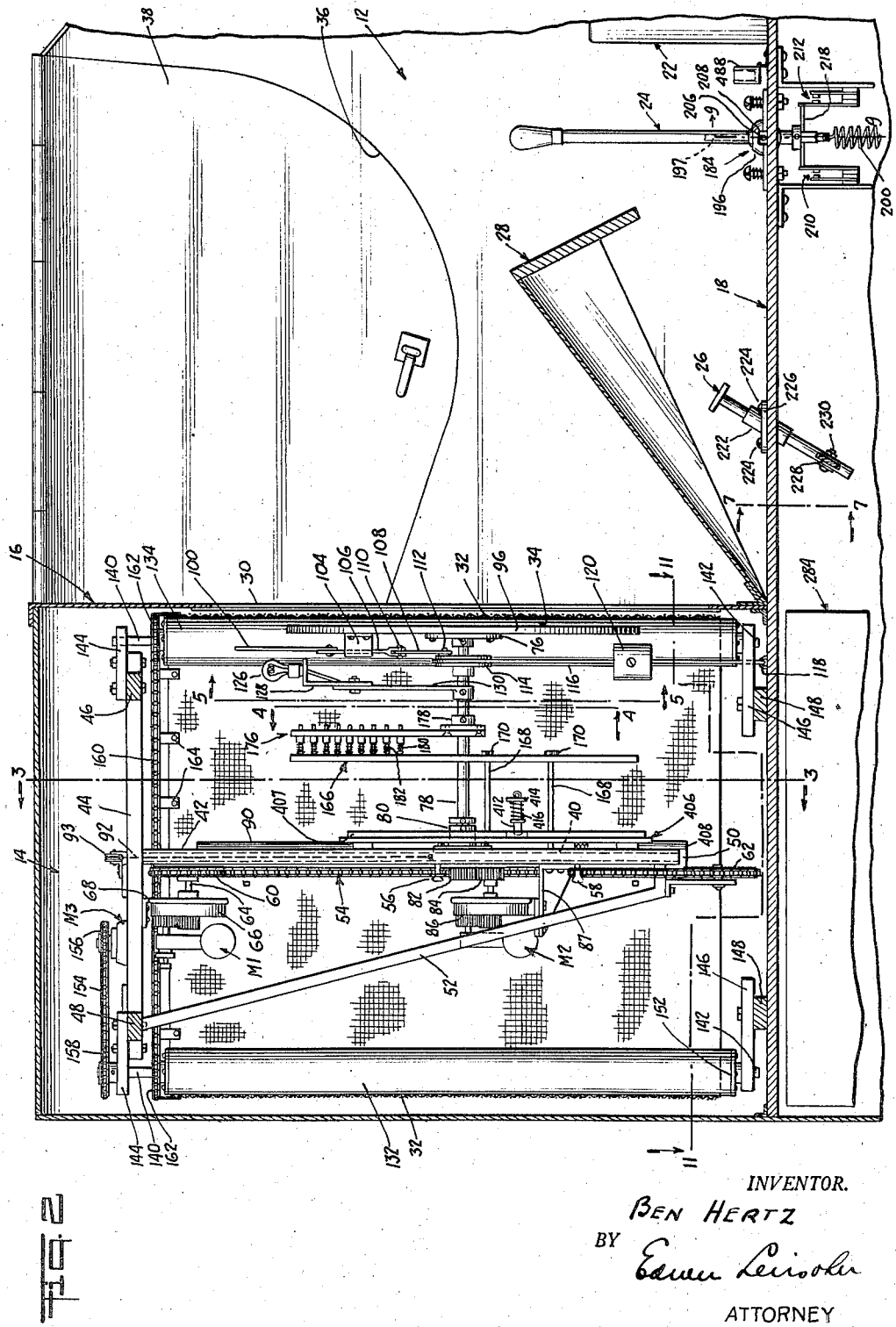

Nov. 9, 1948.                     B. HERTZ                     2,453,436
                         FLIGHT TRAINING APPARATUS
Filed March 9, 1943                                     9 Sheets-Sheet 3

INVENTOR.
BEN HERTZ
BY Edwin Reinoehl
ATTORNEY

Nov. 9, 1948.   B. HERTZ   2,453,436
FLIGHT TRAINING APPARATUS
Filed March 9, 1943   9 Sheets-Sheet 4
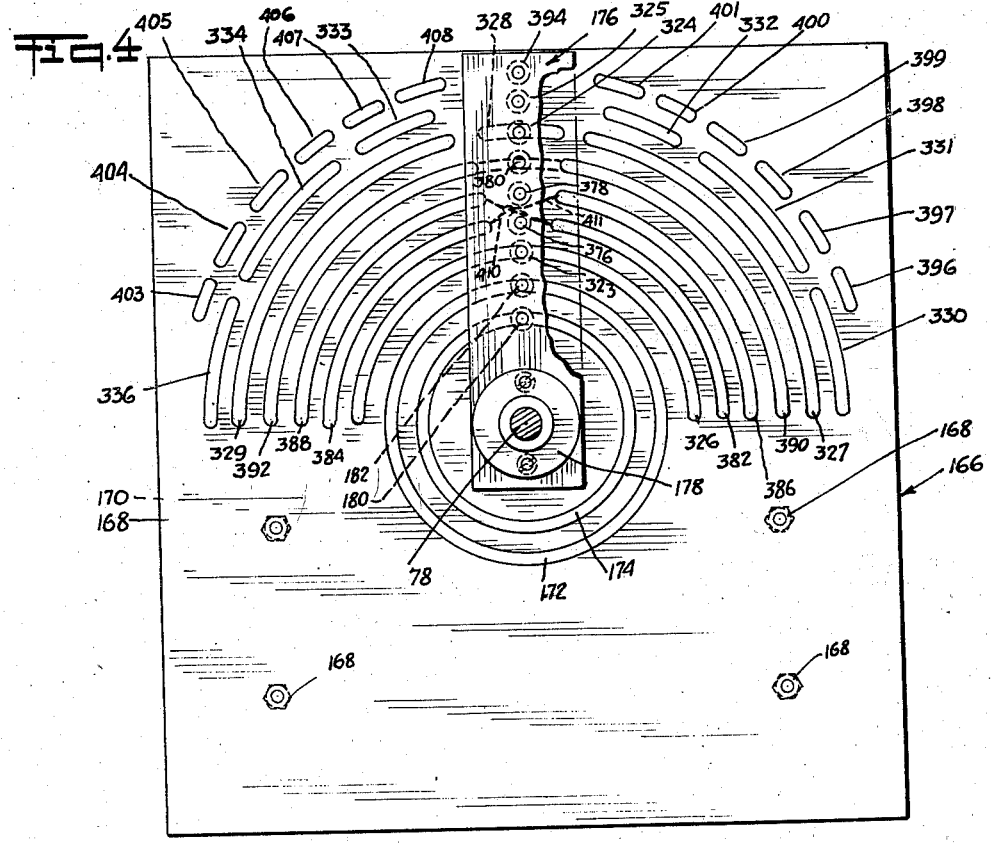
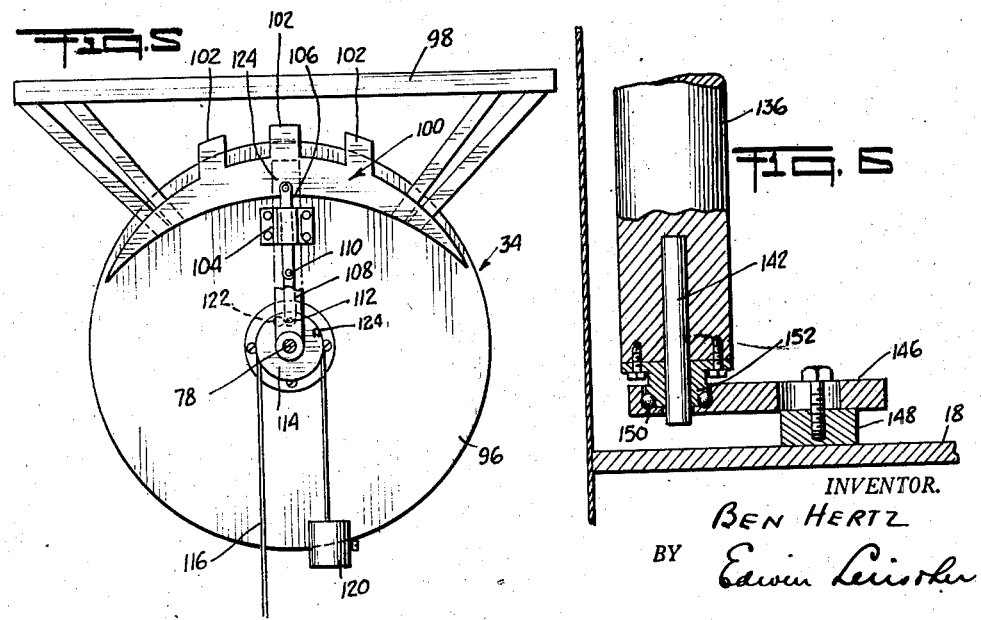
INVENTOR.
BEN HERTZ
BY Edwin Leinster
ATTORNEY Nov. 9, 1948.    B. HERTZ    2,453,436
FLIGHT TRAINING APPARATUS
Filed March 9, 1943    9 Sheets-Sheet 5
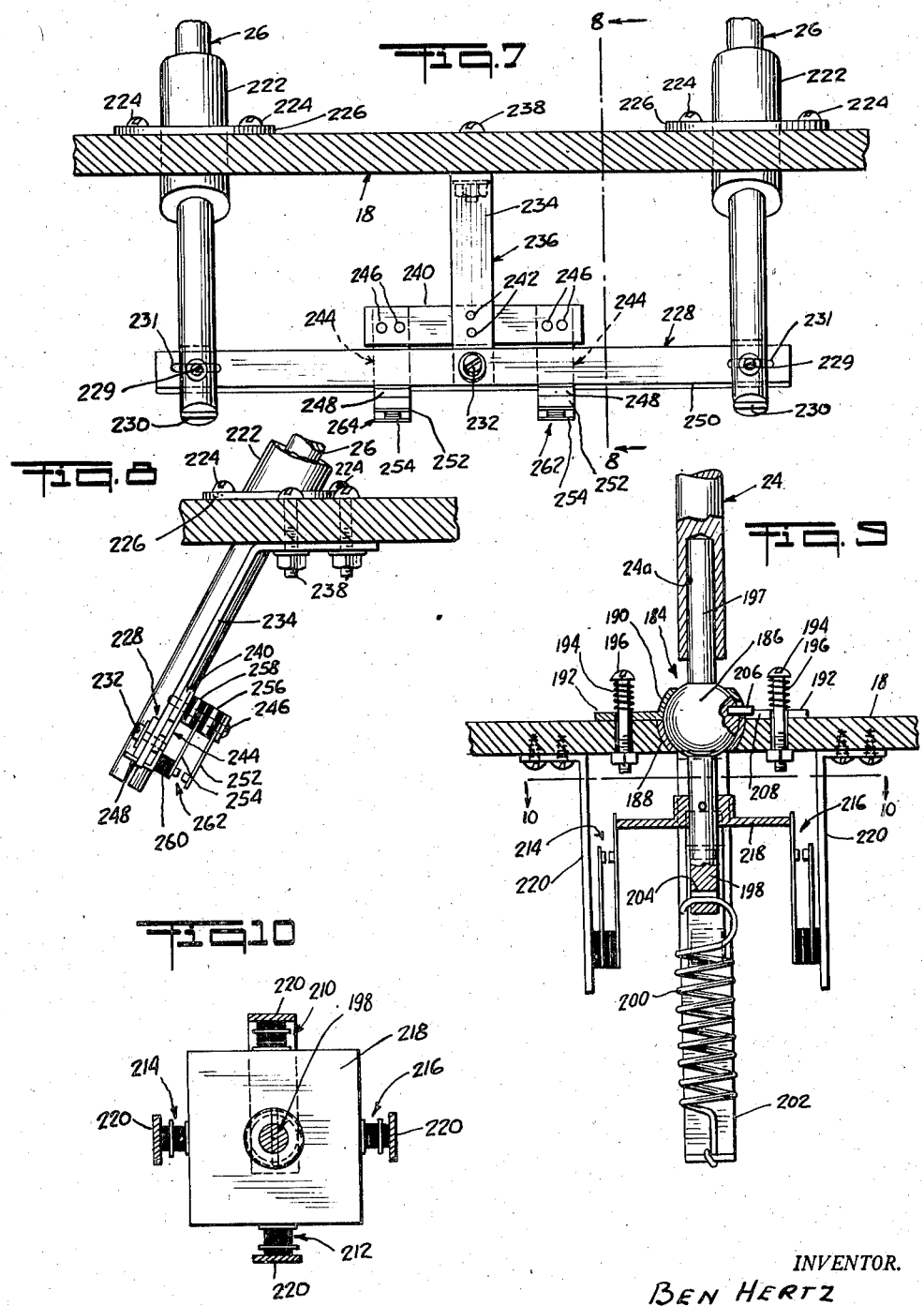
INVENTOR.
BEN HERTZ
BY Edwin Leinohn
ATTORNEY

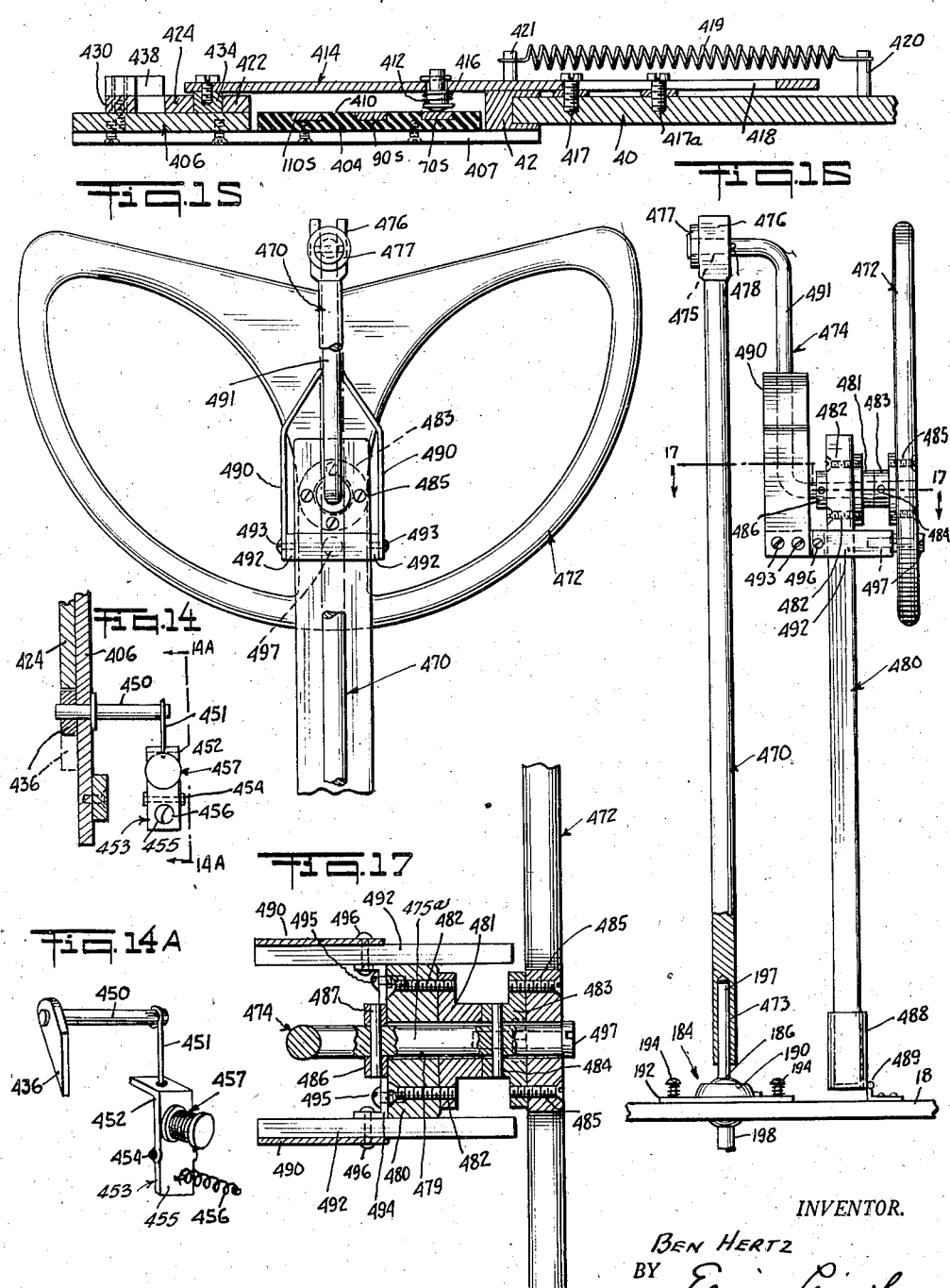

Nov. 9, 1948.   B. HERTZ   2,453,436
FLIGHT TRAINING APPARATUS
Filed March 9, 1943   9 Sheets-Sheet 7
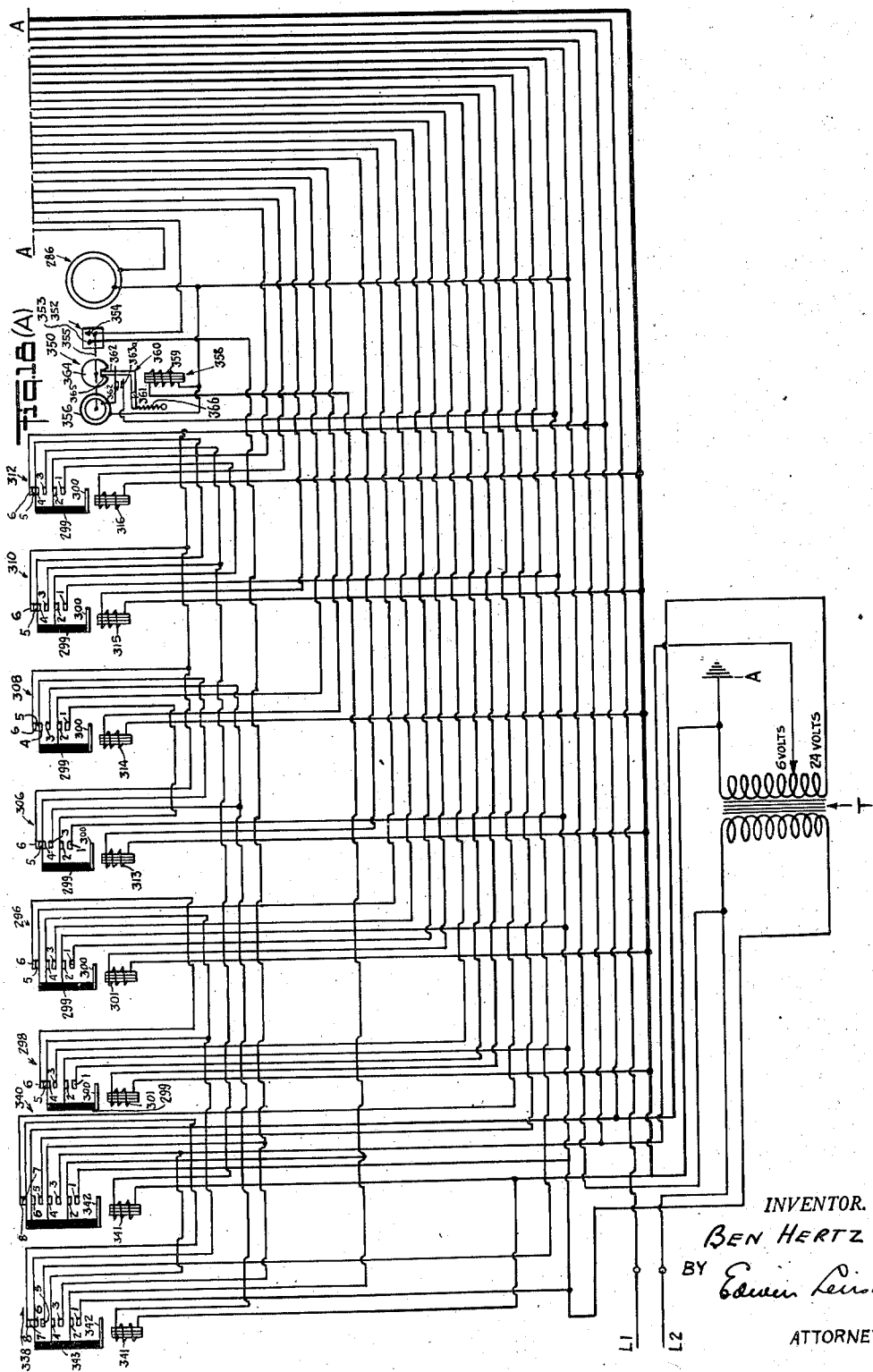
INVENTOR.
BEN HERTZ
BY
ATTORNEY Nov. 9, 1948.  B. HERTZ  2,453,436
FLIGHT TRAINING APPARATUS
Filed March 9, 1943  9 Sheets-Sheet 8
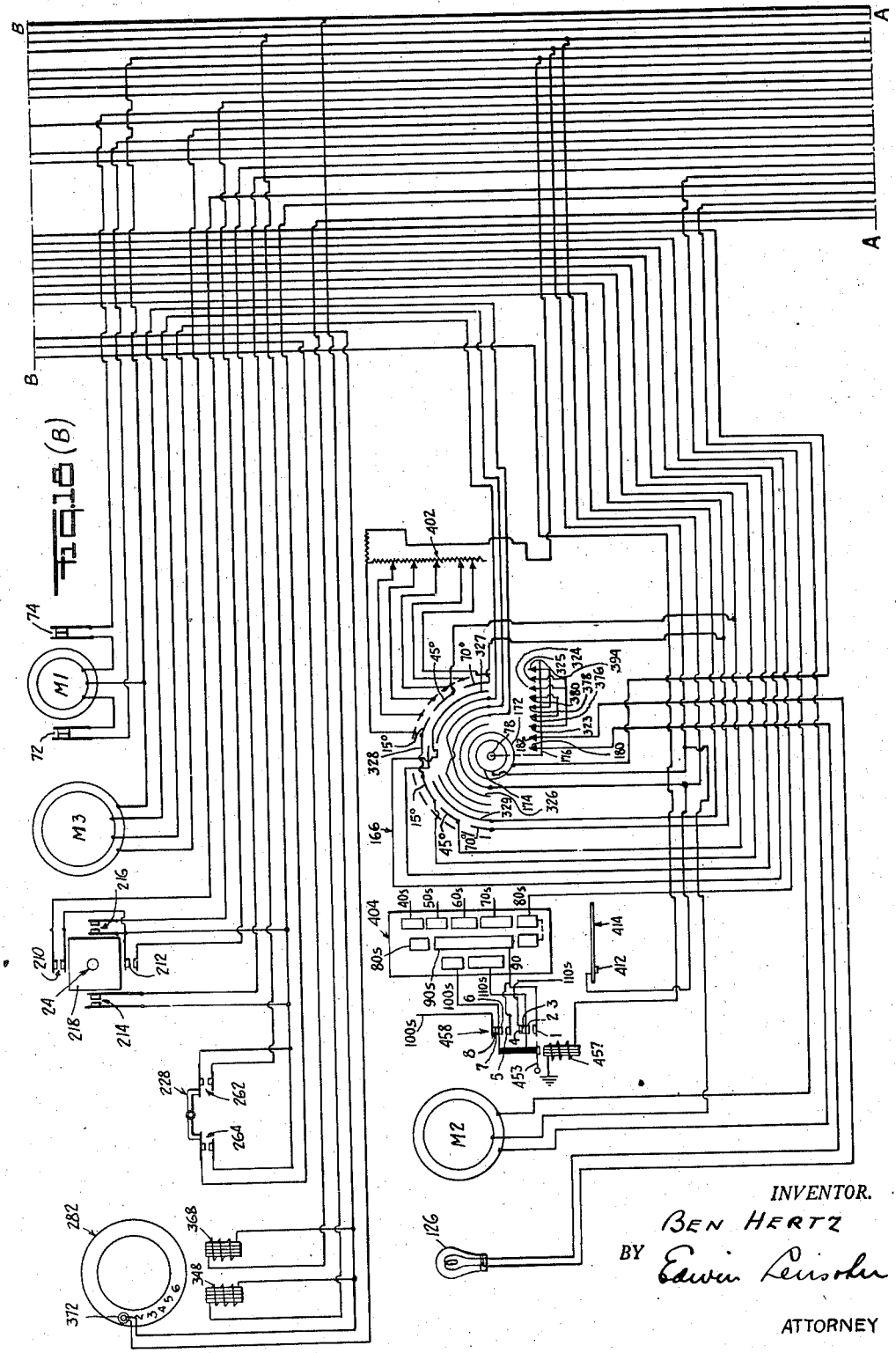
INVENTOR.
BEN HERTZ
BY Edwin Leusohn
ATTORNEY Nov. 9, 1948.     B. HERTZ     2,453,436
FLIGHT TRAINING APPARATUS
Filed March 9, 1943     9 Sheets-Sheet 9
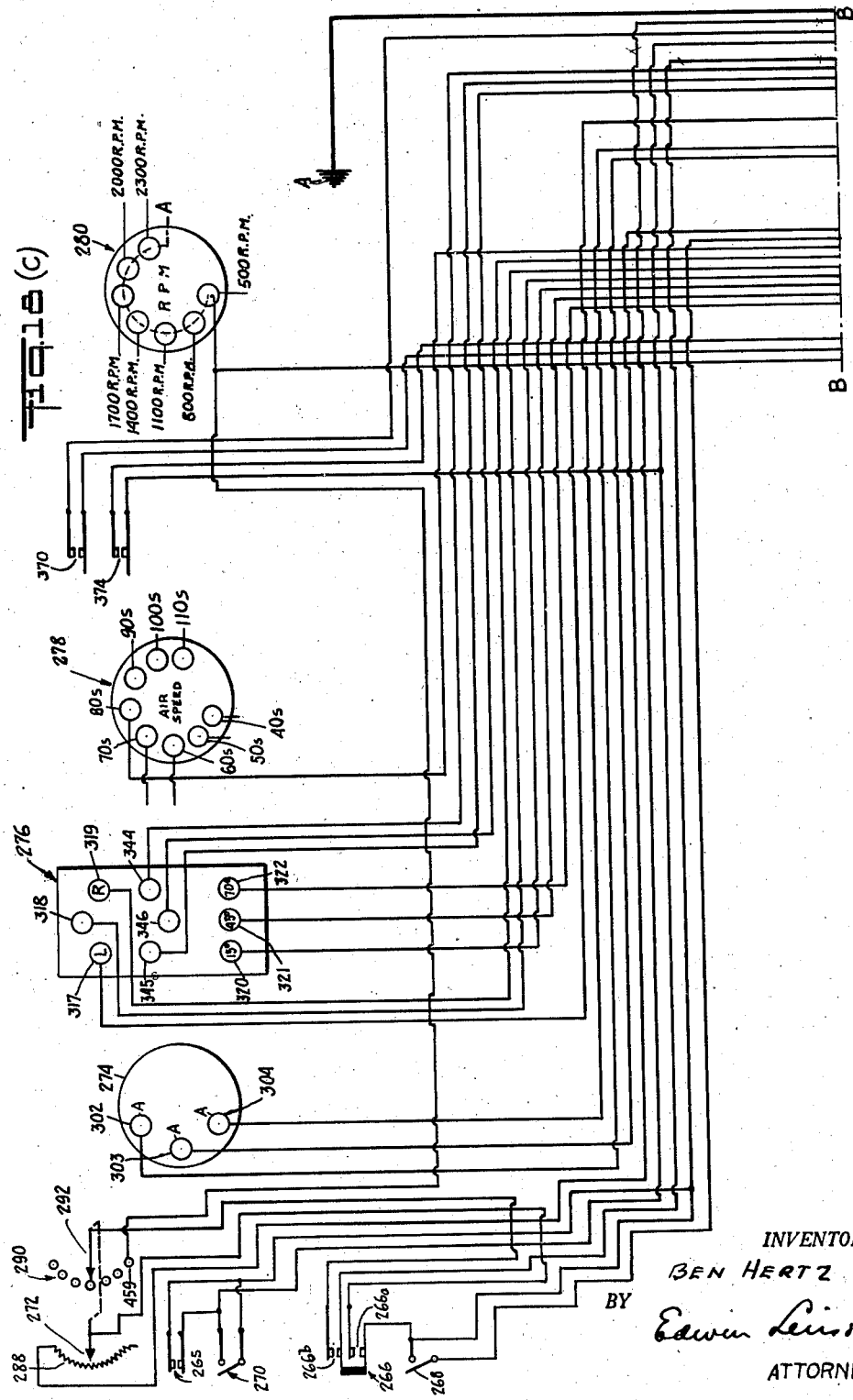
INVENTOR.
BEN HERTZ
BY
Edwin Leinohr
ATTORNEY Patented Nov. 9, 1948

2,453,436

UNITED STATES PATENT OFFICE 2,453,436

FLIGHT TRAINING APPARATUS

Ben Hertz, New York, N. Y., assignor to International Mutoscope Corporation, Long Island City, N. Y., a corporation of New York Application March 9, 1943, Serial No. 478,511

16 Claims. (Cl. 35—12)

This invention relates to flight trainers and more particularly to apparatus for instructing and training student airplane pilots, preliminary to their actual flight training.

One object of the invention is the provision of a flight trainer by the use of which the time required for preliminary instruction of student pilots in the art of flying an airplane is substantially reduced, and which makes possible the instruction of a large class of students in the principles of flight and the operation of an airplane.

Another object of the invention is the provision of a flight training apparatus by which student flyers can become familiar with the various controls of an airplane and obtain instruction and experience in the art of manipulating the controls of airplanes without actual flight. More specifically, it is an object of the invention to provide a flight trainer apparatus in the use of which student flyers not only can become familiar with the various controls and the operation thereof, but can also practice coordination in the operation of various types of controls for maneuvering an airplane, whereby the student flyers may derive not only a clear conception of such maneuvers, but also a considerable degree of experience in accomplishing such maneuvers prior to actual flight.

Another object of the invention is to provide an apparatus in which a movable airplane-simulated part and operating mechanisms or parts movable therewith are moved by electro-motive actuated means operable under the control of the airplane controls, for example, the stick or wheel and simulated rudder-operating pedals, whereby the force necessary to operate the controls can conform to actual conditions and is not governed by the force necessary to move said parts or operating mechanisms.

Another object of the invention is the provision of a flight training apparatus having means for indicating to the student flyer, while he is manipulating the controls, whether his operations and manipulations have been correct or incorrect.

Further, in accordance with the present invention, the action resulting from the operation of the controls by the student flyer is represented on a moving screen, carrying a scene of various landscapes, including the sea, rolling country, mountains, etc., simulating the types of terrain which may be flown over in actual flight, so that while the student flyer operates the controls, he can observe the simulated action of the airplane in relation to such terrain. More specifically, in the operation of the apparatus, a shadow of a simulated airplane structure or part, for example, the nose of an airplane, is thrown on the travelling scene-carrying screen, said shadow moving in relation to the screen, while the latter moves, pursuant to the operation of the controls by the student flyer.

The above and other objects, features, and advantages of the invention will be more fully understood from the following description, reference being had to the accompanying illustrative drawings.

In the drawings:

Fig. 1 is a perspective view of a flight training apparatus embodying the present invention, part of the housing being broken away for the purpose of illustration;

Fig. 2 is a longitudinal vertical view, partly in elevation, and partly in section, of the apparatus, with parts omitted for the purpose of illustration;

Fig. 4 is a view on the line 4—4 of Fig. 2;

Fig. 5 is a view on the line 5—5 of Fig. 2;

Fig. 6 is a detailed sectional view on the line 6—6 of Fig. 3;

Fig. 7 is a view taken on the line 7—7 of Fig. 2;

Fig. 8 is a sectional view on the line 8—8 of Fig. 7;

Fig. 9 is a sectional view on the line 9—9 of Fig. 2;

Fig. 10 is a sectional view on the line 10—10 of Fig. 9;

Fig. 11 is a horizontal sectional view on the line 11—11 of Fig. 2, parts being omitted for the purpose of illustration;

Fig. 12 is a sectional view on the line 12—12 of Fig. 3;

Fig. 13 is a sectional view on the line 13—13 of Fig. 3;

Fig. 14 is a sectional view on the line 14—14 of Fig. 3;

Fig. 14A is a view in elevation taken along the line 14A—14A of Fig. 14;

Fig. 15 is a front view of part of a wheel control which may be used instead of the stick control;

Fig. 16 is a side view of the wheel control;

Fig. 17 is a sectional view on the line 17—17 of Fig. 16;

Fig. 18 is a circuit diagram, being shown in three sections, 18(A), 18(B) and 18(C), on three different sheets, respectively, the wires terminating at the line A—A in Fig. 18(A) being connected to the corresponding wires at the line A—A of Fig. 18(B), and the wires terminating at the line B—B of Fig. 18(B) being connected to the corresponding wires at the line B—B of Fig. 18(C).

Figure 3:
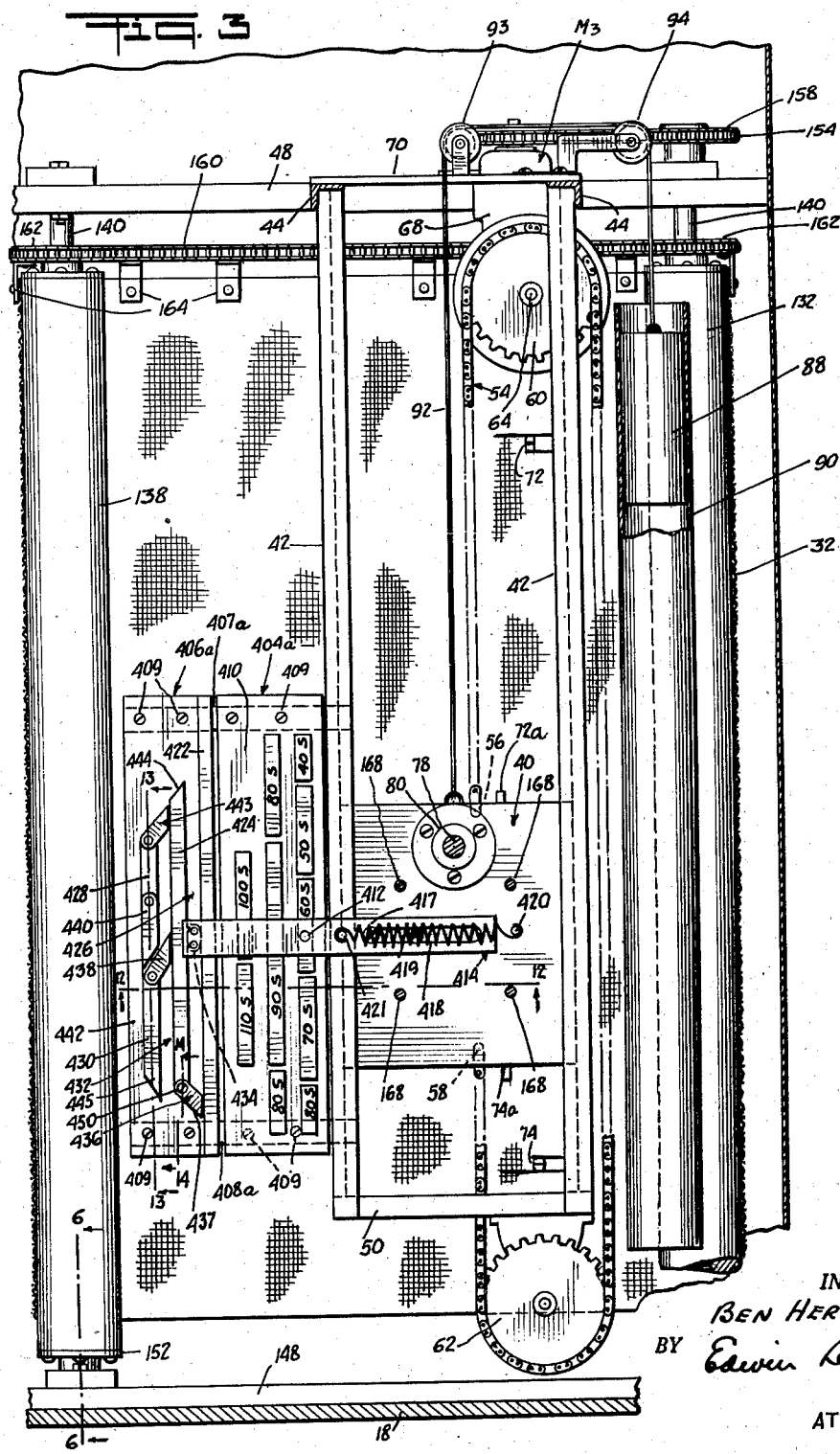
Fig. 3 is a vertical sectional view on the line 3—3 of Fig. 2.

Referring now to the drawings in detail, the flight trainer embodying the present invention comprises a housing 10 having a compartment 12 simulating a cockpit of an airplane and a compartment 14 in which most of the mechanisms are positioned, said compartments being separated by a vertical partition wall 16 (Figs 1 and 2). The floor 18 of the cockpit is raised above the bottom 20 of housing 10 and extends for the full width and length of the housing whereby it also constitutes the bottom of compartment 14, and the walls and floor provide a space within which certain of the mechanisms and other parts of the apparatus may be disposed. The flyer's seat is indicated at 22 in Fig. 1, the control stick is indicated at 24, and the simulated rudder-operating pedals are indicated at 26. An instrument panel 28 is provided in the cockpit simulating compartment 12. Partition wall 16 is provided with a transparent glass window 30 through which a travelling translucent screen 32 is visible, and on which the shadow of the airplane-simulating part 34 is thrown, said shadow being visible, of course, through the glass window 30 of the viewing opening to the student flyer while the latter is seated in the cockpit. The housing 10 is provided with side openings 36 which can be closed by the pivoted closure members 38. In Fig. 1 both closure members are shown in open position, and it will be understood that said openings 36 provide entrances and exits to and from the cockpit at both sides thereof.

The means for operating the airplane-simulating part or nose 34 will now be described. Said means comprises a slide 40 (Fig. 3) slidably mounted for vertical movement in channel guide members 42 carried by and depending from angle irons 44 forming a part of the frame. Said angle irons 44 extend in laterally spaced relation longitudinally of housing 10, and are secured at their opposite ends to the transverse frame members 46 and 48, respectively. The lower ends of guide members 42 are connected by a cross member 50, and said guide members are also held in position by a frame member or strut 52, which extends from frame member 48 to cross member 50 and is rigidly connected at its opposite ends to said members 48 and 50, respectively. A sprocket chain 54 is connected at its opposite ends to lugs 56 and 58 secured to slide 40 at or near its opposite ends, respectively. In Fig. 3, the connections of the sprocket chain to slide 40 are shown as displaced from the center of the width of the slide, but said connections are preferably at the center and are shown as off center in order to avoid crowding of these parts with other parts of the drawing. Said sprocket chain is driven by a sprocket wheel 60 mounted above slide 40 and engages a sprocket wheel 62 mounted below said slide. Sprocket wheel 60 is fixed to and is rotated by a rotary shaft 64 actuated by electromotive means, preferably a reversible rotary motor M1 (Fig. 2) through reduction gearing 66. Said motor M1 and its reduction gearing is carried by a hanger 68 fixed to and depending from a supporting member 70 carried by angle irons 44. It will be understood that when motor M1 rotates in one direction, slide 40 is moved rectilinearly in guides 42 in one direction, say upwardly, and that when motor M1 rotates in the opposite direction, said slide is moved rectilinearly in the opposite direction, say downwardly. Normally closed switches 72 and 74 are carried by one of the guides 42 in position to be engaged by the switch operating members 72A and 74A, respectively, which are carried by slide 40 at the opposite ends thereof, whereby said switches are opened by the slide at the opposite ends, respectively, of the travel thereof in guides 42. These switches 72 and 74 control the circuit of motor M1, as will hereinafter more fully appear, whereby to limit the travel of slide 40 in both directions.

The airplane-simulated part 34 is mounted for rectilinear movement with slide 40, and is also mounted for turning or curvilinear movement on said slide, whereby said part 34 can be moved up and down to simulate the climb and descent of an airplane and can turn in two directions to simulate the turning or banking of an airplane. For this purpose, part 34 is removably secured to a plate 76 (Fig. 2) carried by a rotary shaft 78 journalled for rotation in a bearing 80 fixed to slide 40 at one side thereof. Shaft 78 projects through slide 40 to the opposite side thereof, and at said opposite side of slide 40, shaft 78 has a gear 82 secured thereto. Gear 82 meshes with and is driven by a gear 84 actuated by electromotive means, preferably a reversible electric motor M2, through reduction gearing 86. Motor M2 is movable with slide 40, being mounted on a bracket 87 carried by said slide. Thus, the electro-motive means constituted, as here shown, by the reversible motors M1 and M2 are operatively connected to airplane-simulated part 34 for moving the latter rectilinearly in either of two directions, specifically up and down, to simulate the climb and descent of an airplane, and for moving said airplane simulated part 34 curvilinearly in two directions, specifically right and left, to simulate the turning or banking movements of an airplane. It will be understood that the rectilinear movement of part 34 in either direction can take place simultaneously with the curvilinear movement of said part in either direction, and that rectilinear movement of part 34 in either direction can take place without curvilinear movement thereof and vice versa. As will be hereinafter described, operation of motor M1 for effecting the rectilinear movement of part 34 is controlled by the simulated control element or stick 24 and that the operation of motor M2 for effecting curvilinear movement of part 34 is controlled jointly by said stick 24 and by one of the simulated rudder-operating pedals 26, depending upon the direction in which part 34 is to be turned. The weight of slide 40 and of all of the parts carried thereby is balanced by a counterweight 88 (Fig. 3), so that the force required to move slide 40 is comparatively low. Said counterweight 88 is movable in a guide tube or cylinder 90 which is open at both ends, the upper end of said weight being connected to the upper end of slide 40 by a flexible cord or chain 92 which passes over guide rollers 93 and 94. Cylindrical weight 88 slidably fits in cylindrical tube 90 with a slight clearance.

The airplane-simulated part 34 comprises a plate 96 which is fixed to bracket plate 76 for rotation of part 34 by shaft 78 as described above, and said plate 96 has fixed thereto a member 98 (Fig. 5) which together with plate 96 resembles the appearance of a nose of an airplane, as the flyer would see it, while sitting in the cockpit of the plane looking directly ahead. As this simulated airplane nose is removably secured to bracket plate 76, it is quickly removable and replaceable by a simulated airplane nose of any one of several different types of airplanes. Airplane simulated part 34 is also provided, as here shown, with a member 100 (Figs. 1 and 5) which simulates the upper part of the airplane engine as seen by the flyer from the cockpit, and to make the effect more realistic, member 100 is movable from the projected position illustrated in Fig. 5, in which position the simulated engine portions 102 are visible to the flyer, to a retracted position, in which said portions 102 are concealed behind plate 96. Further, provision is made for moving member 100 automatically to said projected and retracted positions thereof under the control of the movement of slide 40. Member 100 is guided for said movement thereof in respect to plate 96 by a guide member 104, fixed to said plate and slidably engaging a rod 106 fixedly secured at its upper end to member 100. The lower end of rod 106 is pivotally connected to one end of a link 108 by a pivot pin 110. The lower end of link 108 is pivotally connected by a pin 112 to a grooved pulley 114 in eccentric relation thereto. Said pulley is mounted for turning movement on shaft 78 being rotatable on and in relation to said shaft. A cord 116 passes around pulley 114 in the groove thereof, one end of said cord being fixed to floor 18 or to some other stationary part, as indicated at 118 in Fig. 2, and the other end of said cord is attached to a weight 120. When shaft 78 is moved upwardly or downwardly by slide 40, pursuant to the operation of motor M1, the corresponding movement of pulley 114 with shaft 78 results in the turning of said pulley on the shaft by reason of the frictional engagement of cord 116 in the groove of said pulley. The movement of member 100 to its projected position is limited by the engagement of pin 112 with a stop member 122 carried by plate 96 in the path of movement of pin 112. The movement of member 100 to its retracted position is limited by the engagement of pin 124 with the top of guide 104. It will be understood that cord 116 does not interfere with the rectilinear movement of shaft 78, notwithstanding the inability of pulley 114 to turn when stop members 122 and 124 are engaged, since said cord can slip over said pulley while shaft 78 moves up or down, at the times when said stop members are engaged. Member 100, and the mechanism for operating the same, are so arranged with respect to plate 96 that said member is in its retracted position in simulated descent or simulated level flying, and so that said member 100 is in its projected position in the simulated ascent of part 34.

In accordance with the present invention, provision is made for casting a shadow of simulated airplane part 34 on screen 32. For this purpose, a source of light, here shown as an electric lamp 126, is mounted at the back of part 34. Said lamp is carried by a bracket 128 supported by arm 130 fixed to and rotatable by shaft 78. Thus lamp 126 is mounted for movements, rectilinear and curvilinear, corresponding to said movements, respectively, of part 34.

Screen 32, which is translucent and on which the shadow or representation of airplane-simulated part 34 is visible to the flyer in the cockpit 12, is movable in front of said part 34 from left to right, and vice versa, past translucent glass window or viewing opening 30. It will be understood that a panorama scene of terrain as seen from an airplane is depicted on screen 32, and preferably said scene includes the representation of an air field or a part thereof, for example a landing strip. As here shown, said screen 32 is in the form of an endless web, which engages vertical rollers 132, 134, 136 and 138 (Figs. 2, 3 and 11) and travels around said four rollers. Said rollers are each provided with an upper shaft 140 and a lower shaft 142. Each upper shaft is journalled for rotation in a roller or anti-friction bearing in a bracket 144 fixed to frame members 46 and 48, respectively. The lower shafts 142 are journalled for rotation in brackets 146 fixed to adjacent frame members 148. Each bracket 146 is provided with a roller or other anti-friction bearing member 150 which is engaged by a companion bearing member 152, fixed to the lower end of the roller. Thus, the rollers 132, 134, 136 and 138 are rotatably supported by brackets 146 at their lower ends, and have their upper ends or axles rotatably mounted in the companion brackets 144. One of said rollers, here shown as roller 132, is a driving roller, said roller 132 being actuated by electro-motive means, preferably a reversible electric motor M3, which is connected to the shaft 140 of roller 132 by a sprocket chain 154 which engages the sprocket wheel 156 on the shaft of motor M3 and the sprocket wheel 158 fixed to the shaft 140 of said roller. The rollers 132, 134, and 136 are connected for conjoint rotation by a sprocket chain 160 which engages a sprocket wheel 162 fixed to the companion axles 140 of said rollers, respectively. Thus rollers 134, 136 and 138 are driven by roller 132 at the same speed, all of said roller sprocket wheels being of the same diameter. The web which constitutes screen 32 and which engages said rollers and is driven thereby, is attached to sprocket chain 160 by a plurality of peripherially spaced clips 164, secured to and depending from said sprocket chain and fastened in any suitable way to the upper edge of screen web 32. Screen 32 is formed of any suitable translucent sheet material, and has delineated on its outer surface a panorama view of varying landscapes, including representations of the ocean, rolling country, high mountains, a simulated landing strip, etc., whereby to simulate all types of terrain which may be flown over in actual flying.

A contact carrying plate 166 (Figs. 2 and 4) is mounted for rectilinear movement with slide 40, said plate being secured to said slide by rods 168 fixed to and projected forwardly from said slide, and having their end portions fastened to plate 166 in any suitable way as by nuts 170. Plate 166 is formed of insulation material and is provided with a plurality of radially spaced arcuate contact strips, including the peripherally continuous contact strips 172 and 174, and the other strips illustrated in Fig. 4, which will be later described in connection with companion parts of the apparatus. A contact carrying arm 176 is fixed to and is rotatable by a collar 178 secured to and rotatable by shaft 78. It will be understood that shaft 78 projects freely through plate 166 and that said plate is not rotated by said shaft, but only moves up and down with slide 40 in fixed relation thereto. The contact carrying arm 176 is provided with a plurality of spring-pressed contact members positioned to engage the companion strips, respectively, on plate 166, there being two spring-pressed arms 180 and 182 which engage strips 172 and 174, respectively, and other similar contact members, which will be hereinafter referred to in reference to the other contact strips carried by the plate 166. It will be understood that said contact members carried by arm 166 are insulated from each other, unless electrically connected to each other as subsequently indicated. Contact members 180 and 182 are electrically connected to the lamp 126, and contact strips 172 and 174 are connected to a source of current all as more specifically illustrated in the circuit diagram (Fig. 18B).

As indicated above, the motors M1 and M2 are operable under the control of simulated airplane-control elements. More particularly, motor M1 is operable under the control of stick 24, and motor M2 is operable under the joint control of stick 24 and pedals 26. First, with respect to the control of motor M1 by stick 24, this part of the apparatus will now be described with more particular reference to Figs. 9 and 10 in conjunction with Fig. 2. Stick 24 has a universal joint connection 184 in the floor 18 of the cockpit 12. Said universal joint connection comprises a ball 186 fixed to said stick near the lower end thereof, and engaging the hollow spherical segments 188 and 190, which provides a socket for ball 186. Segment 190 is provided with flanges 192 which are engaged by springs 194 for resiliently holding said segment against ball 186, said springs being held under compression by the heads of bolts 196 fastened to floor 18. Stick 24 is preferably removable from the universal joint connection so that said stick can be replaced by a wheel control device as will hereinafter be described in detail. For this purpose, the lower end of stick 24 is provided with a socket 24A (Fig. 9) which removably fits over a stud rod 197 which projects upwardly from ball 186 in fixed relation thereto. The lower stud rod 198 which is fixed to ball 186 is engaged by a tension spring 200 for holding stick 24 in its normally vertical and neutral position, one end of said spring being attached to a bracket 202 fixed to and depending from floor 18, and the opposite end of said spring engaging lower stud rod 198 in a slot 204. A pin 206 fixed to ball 186 engages segment 196 in a notch 208 for preventing axial turning of stick 24. A plurality of sets, 210, 212, 214 and 216, of normally open companion contact members are positioned below floor 18 for operation by an actuating plate 218 carried by stud rod 198 in fixed relation thereto, the sets 210 and 212 of companion contact members being opposite each other, and the sets 214 and 216 of companion contacts being opposite each other, and positioned between and 90° from the adjacent sets 210 and 212 of contact members. Each set of contact members is carried by a bracket 220 fixed to and depending from floor 18. As contact members 210 and 212 control the operation of motor M1, in the manner to be subsequently more fully described, for effecting the up and down movements, respectively, of slide 40 and of the airplane simulated part 34 actuated thereby, said sets 210 and 212 of contact members may be conveniently referred to as the "up switch" and the "down switch," respectively. Similarly, as sets 214 and 216 of contact members control the operation of motor M2, in the manner more fully to be described, for turning shaft 78 and airplane simulated part 34 carried thereby to the right and to the left, respectively, viewed from the cockpit 12, said sets of contact members may be conveniently referred to as the "right switch" and the "left switch," respectively.

Referring now to the simulated rudder-pedal controls 26, (Figs. 2, 7 and 8), said pedals are mounted for sliding movement in guide members 222, which project through floor 18 and are secured to the top of said floor in any suitable way as by screws 224, which fasten the flanges 226 of said guide members to said floor. The lower ends of pedals 26 are connected by a cross bar 228 by means of pivot pins, here shown as bolts 229, each of said bolts providing a pivotal connection between one end of bar 228 and the adjacent pedal 26. Said pivot pins pass through the slotted lower ends 230 of pedals 26 and engage bar 228 in slots 231 thereof. Bar 228 is pivotally connected at its center by a pivot pin, here shown as a screw 232, to the lower end of the strap 234 of a bracket 236. Said strap 234 depends from the lower surface of floor 18 being secured thereto in any suitable way, as by bolts 238. A cross strap 240 is fixed to strap 234 near the lower end thereof above pivot 232, in any suitable way, as by rivets 242. It will be observed that bar 228 and cross strap 240 are disposed at opposite sides of strap 234, so that said cross strap 240 does not interfere with the pivotal movement of bar 228. L-shaped spring members 244, formed of flat spring metal stock, are secured at the opposite ends of cross strap 240 in any suitable way as by screws 246. Said spring members 244 have forwardly bent lower end portions 248 which engage the lower edge portion 250 of bar 228 at opposite sides of pivot 232. A pair of normally open companion contact members 252 and 254 is secured to each spring member 244 by the companion pins 246, suitable insulation members 256 and 258 being provided to insulate the companion contact members 252 and 254 from each other and from the companion spring member 244 and from cross strap 240. The contact member 254 of each pair of companion contact members is provided with an insulation member 260 which engages the companion spring member 244 near the bent end portion 248 thereof.

It will be understood that when one of the pedals 26 is depressed, bar 228 turns on its pivot pin against the end portion 248 of the spring member 244, which is at the same side of pivot pin 232 as the pedal which is being depressed. When bar 228 is thus turned on its pivot pin 232, the end portion 248 of the spring member which opposes this turning movement is engaged by the lower edge 250 of said bar, and spring member 244 is flexed to the right, viewing Fig. 8, thus moving the contact of contact member 254 into engagement with the contact of companion contact member 252. When the pressure on the depressed pedal is released, the flexed spring member 244 returns bar 228 to the neutral position thereof, illustrated in Figs. 7 and 8, permitting contact member 254 to move to its circuit-interrupting position, illustrated in Fig. 8. For convenience in subsequent reference herein, one pair of companion contact members 252 and 254 will be designated as the left pedal switch 262, and the other companion pair of contact members will be designated as the right pedal switch 264. As will be subsequently explained in reference to the circuit diagram (Fig. 18B), these left and right pedal switches, 262 and 264, respectively, must be operated in conjunction with the left switch 214 and right switch 216 of stick 24, respectively, in order to energize motor M2 which actuates shaft 78 for turning airplane simulated part 34 to the right or to the left, as the case may be, the arrangement being such that unless the left pedal is depressed simultaneously with the movement of the stick to the left, motor M2 will not be energized, and similarly said motor M2 will not be energized when stick 24 is moved to the right unless the right pedal is simultaneously depressed. In other words, in order to energize motor M2 for turning part 34 either to the right or to the left, it is necessary to turn stick 24 in the corresponding direction, and at the same time to depress the corresponding pedal 26, namely, to depress the left pedal when stick 24 is turned to the left, and to depress the right pedal when stick 24 is turned to the right.

Various indicating instruments, manually operated switches, and rheostats are provided and mounted in position, either on instrument panel 28, or on some other stationary part in the cockpit 12, so that said indicating instruments can be readily viewed by the flyer, and so that convenient access may be had to the manually operated switches and rheostats by the flyer or by the instructor in the cockpit. Thus, as illustrated more or less diagrammatically in Fig. 1, the panel 28 has mounted at the front thereof a main control switch 265, "gas" switch 266, a scene-light switch 268, a continuous operation switch 270, a simulated-throttle switch 272, a climb and descent indicator 274, a bank and turn indicator 276, an air speed indicator 278, and an engine speed indicator 280. In addition, a mistake counter 282 is mounted in a convenient place, here shown as the upper part of partition wall 16. Various electrical devices, which will hereinafter be described, are disposed within a cabinet 284 positioned in the housing beneath floor 18, although it will be understood that said electrical devices may be mounted at any convenient position. It will be understood that cabinet 284 may house all of the electrical devices which are not mounted in or upon other parts of the apparatus.

Said electrical devices and the operative relation thereof in the apparatus and to the various parts thereof, will now be described with particular reference to the circuit diagram, Fig. 18. As shown in the circuit diagram, current of various voltages, depending upon the instruments or devices to be operated thereby, is provided by a transformer T having various take-off taps for said different voltages, respectively, as indicated. Said transformer is connected by lines L1 and L2 to a source of electric current through either switch 265 or switch 270. Switch 265 is a timer controlled switch, the timing device not being shown, as it is not in itself part of the present invention and any suitable timing device may be used. Switches 265 and 270, the latter being a manual switch, are in parallel so that the apparatus may be operated either continuously, i. e., so long as switch 270 is closed, or for a predetermined length of time under the control of switch 265. Switch 266 has two pairs 266A and 266B of companion movable contacts, which supply current at 110 volts and at 6 volts, respectively to the motor of a noise maker 286 (Fig. 18A) and to the airplane engine speed indicator 280, respectively. The current of 110 volts is supplied to the noise-maker motor through a rheostat 288, adjustable by the simulated throttle switch 272, and the current of 6 volts for operating the engine speed indicator 280 is supplied thereto through the rheostat 290, also operated by the simulated throttle switch 272. The noisemaker 286 is shown only diagrammatically, since it is a well known device and does not per se form part of the present invention. It will be understood that the speed of the noise-maker motor will be varied by adjusting the rheostat 288 so that the noise produced by the noise maker will simulate the noises of an internal combustion engine (the airplane engine) operating at various speeds. As here shown, the airplane-engine speed indicator 280 consists of a plurality of lights or indicators which are connected to the stationary contacts, respectively, of rheostat 290 to the point A of the secondary of the transformer T, the letter A being also applied to indicator 280 to designate said last mentioned connection of said lights to the transformer. The 6 volt tap of the secondary of the transformer is supplied to the contacts of rheostat 290 through the pair of contacts 266B of switch 266 to the adjustable arm or movable contact member 292 of rheostat 290. The revolutions per minute indicated by the several lights of the indicator 280 are designated by the speed indications, ranging from 500 R. P. M. to 2300 R. P. M. on said indicator. It will be noted that the scene light 126 is controlled by switch 268 which controls the circuit, to contact strips 172 and 174 of plate 166, contact members 180 and 182 which engage said strips, respectively, being connected to lamp 126. When switch 268 is open, blind flying conditions will be simulated, the flyer being obliged to rely on the instruments.

The control of motor M1 by stick operated switches 210 and 212 takes place through the "up relay" 296 and through the "down relay" 298, respectively. Each of these relays has three pairs of companion contacts, 1 and 2, 3 and 4, 5 and 6, companion contacts 1, 2 and companion contacts 3, 4 being normally open, and companion contacts 5, 6 being normally closed. Contacts 1, 3 and 6 are stationary contacts and contacts 2, 4 and 5 are movable contacts, being fixed to the insulation rod 299 operated by the spring retracted armature 300 of the companion relay, the winding of said relay being indicated at 301. Armature 300 is attracted when winding 301 is energized, thereby closing contacts 1, 2 and 3, 4 and opening contacts 5, 6. Winding 301 of "up relay" 296 is energized when the "up" switch 210 is closed by stick 24 and winding 301 of "down relay" 298 is energized when "down switch" 212 is closed. When contacts 1 and 2 of up relay 296 are closed, current is supplied to motor M1 from the transformer T through the normally closed up limit switch 72 for rotating said motor M1 in a direction to raise slide 40 and the airplane simulated part 34 carried thereby. At the same time, current is supplied through contacts 3, 4 of up relay 296 to the up-indicating light 302 of the climb indicator 274. Contacts 5 and 6 being opened, the light 303 of said indicator 274 is extinguished, the circuit of said light being controlled by said contacts 5, 6 of relay 296. It will be understood that when up switch 210 is opened, the contacts of the up relay 296 will return to their normal position, thus de-energizing the up relay winding 301, and breaking the circuits controlled by companion contacts 1 and 2, and companion contacts 3 and 4, and making the circuit controlled by companion contacts 5 and 6, thus interrupting the rotation of motor M1 in the up direction, extinguishing the up light 302, and energizing the level flying light 303 of said indicator. The down relay 298 is controlled by the down switch 212 in substantially the same way as the control of the up relay 296 by the up switch 210. It will be understood that when the winding 301 of down relay 298 is energized by closing of the down switch 212, current is supplied to motor M1, through the down limit switch 74, for operating said motor in a direction to lower slide 40 and the simulated airplane part 34 carried thereby. At the same time, current is supplied to the descent-indicating light 304 of indicator 274, and the level flying indicating light 303 is extinguished. When down switch 212 is opened, the operation of motor M1 for lowering slide 40 is terminated, descent-indicating lamp 304 is extinguished, and level-flying indicating lamp 303 is energized.

As explained above, motor M2 is operated for turning shaft 78 and the airplane simulated part 34 either to the right or to the left, viewing said part 34 from the cockpit, by the movement of stick 24 to the right and by the simultaneous movement of the right pedal 26 for closing the right stick-controlled switch 214 and the right pedal-controlled switch 264, respectively. The right stick-controlled switch when closed operates the "right stick" relay 306, and the right pedal-controlled switch 264 when closed operates the "right pedal" relay 308. Similarly, the left stick-controlled switch 216 and the right pedal-controlled switch 262 must be operated concurrently for closing the operation of motor M2 for turning airplane-simulated part 34 to the left, and this is accomplished by said last mentioned switches through the "left stick" relay 310 and through the "left pedal" relay 312. The circuits of relay windings 313, 314, 315 and 316 of relays 306, 308, 310, and 312, respectively, are opened and closed by switches 214, 264, 216 and 262, respectively. It will be noted that each of these relays is of the same construction as relays 296 and 298, and has two pairs of normally open companion contacts 1, 2 and 3, 4 and a pair of normally closed companion contacts 5, 6. When the windings of these relays are energized, the spring retracted armatures 300 thereof are operated to engage the normally open pairs of contacts 1, 2 and 3, 4, and to disengage the normally closed contacts 5, 6. When the right stick relay contacts 1 and 2 are engaged, and when the right pedal contacts 1 and 2 are engaged, current is supplied to motor M2 for rotating said motor in the proper direction to turn airplane simulated part 34 to the right, and similarly with the closing of contacts 1, 2 of the left stick relay 310, and the contacts 1, 2 of the left pedal relay 312, current is supplied to said motor M2 for rotating the latter in the opposite direction, whereby to cause the airplane simulated part 34 to turn to the left.

Thus, the student flyer can learn to operate the stick and the rudder pedal controls properly by actuating the stick and the pedals and by observing the movement of the shadow of airplane simulated part 34 on screen 32. In the event, however, that switch 268 is opened for "blind flying," in which case the scene light 126 is extinguished and there is no shadow of part 34 on screen 32, the student flyer can observe the results of his manipulations of the stick 24 and of the rudder pedals 26 by watching the bank and turn indicator 276, and more particularly, the turn indicating lights 317, 318 and 319, and the turn-degree lights 320, 321 and 322 of said indicator 276. Said indicator lights 317 to 322, inclusive, are operated under the control of contact arm 176 which is turned by shaft 78, and more particularly by contact members 323, 324 and 325, which are carried by said arm and which engage the companion contact strips on contact plate 166. More particularly, contact member 323 engages the contact strip 326 which is connected to one side of the 6 volt tap of the transformer secondary, the other side of the 6 volt part of the transformer secondary being connected to each of said lights 317 to 322, inclusive. Contact member 324, carried by arm 176, is engageable with the strips 327, 328 and 329 which are connected, respectively, to lights 319, 318 and 317, for indicating right turn, straight ahead, and left turn positions of the airplane simulated part 34. Contact arm 325 is engageable with the contact strips 330, 331, 332, 333, 334 and 336, the contact strips 332 and 333 being connected to the 15° indicating lamp 320, contact strips 331 and 334 being connected to the 45° indicating light 321, and contact strips 330 and 336 being connected to the 70° indicating light 322. As illustrated in the circuit diagram, contact members 323, 324 and 325 are electrically connected to each other.

In the event that the student flyer does not operate the stick and pedal controls properly for making a turn in either direction, not only does the motor M2 fail to operate, but the flyer's mistake is indicated instantaneously on the bank and turn indicator 276 to warn the flyer of any mistake, and if the mistake is not cured quickly enough, it is registered on the mistake counter indicator 282. For this purpose, the apparatus includes the relays 338 and 340 which, for convenience in reference, will be designated, respectively, as the "right mistake" relay and the "left mistake" relay, respectively. Each of these relays includes an operating winding 341 which attracts a spring retracted armature 342 when said winding is energized. Relay 338 has the normally open companion contacts 1, 2, 3, 4 and 5, 6 and a pair of normally closed companion contacts 7, 8, contacts 6 and 7 being electrically connected to each other. Contacts 2, 4, 6 and 7 are movable contacts, the other contacts of this relay being stationary. Said movable contacts are connected to the operating insulation member 343 which is actuated by armature 342. Left mistake relay 340 is similarly provided with normally open companion contacts 1, 2, 3, 4, and 5, 6, and the normally closed companion contacts 7, 8, and is similar in this respect to relay 338 except that contact 7 of relay 340 is not electrically connected directly to contact 6. When the right mistake relay 338 is actuated, pursuant to the energization of its winding 341 as will be presently explained, the closing of contacts 5 and 6 of this relay completes a circuit through the right mistake warning lamp or signal 344 on indicator 276, for operating said warning lamp or signal, and similarly when the left mistake relay 340 is operated, pursuant to the energization of its winding 341, a circuit is completed through the left mistake warning lamp or signal 345 for operating said lamp or signal. In the absence of a mistake, the center light or signal 346 has its circuit completed through the normally closed contacts 7, 8 of right mistake relay 338, and through the similar normally closed contacts 7 and 8 of left mistake relay 340, this circuit through lamp or signal 346 being interrupted either when right mistake relay 338 or left mistake relay 340 is operated for disengaging the companion normally closed contacts 7, 8. If the student flyer corrects his mistake soon enough after his being warned thereof by the operation of either light 344 or light 345, the mistake counter is not operated, but if he does not rectify his mistake soon enough after being warned thereof by either of said warning lights, as the case may be, the mistake counter is operated to register that mistake, the number of mistakes which the flyer makes within a period of time being totalized. To accomplish these results, the stepping relay 348 of the mistake counter register is connected to the mistake relays 338 and 340 through the mistake-delay timer device 350.

The mistake-delay timer device 350 comprises a switch 352 through which pulses are sent to the stepping relay 348 from the contacts 3, 4 of the right mistake relay 338, when the latter is actuated, or through the contacts 3, 4 of the left mistake relay 340, when the latter is actuated. Said switch comprises a stationary contact member 353 and a movable contact arm 354, which makes contact with the stationary contact member 353 of said switch once every revolution of said contact arm. Contact 353 of switch 352 is connected to contact 3 of relay 338 and to contact 4 of relay 340, while contacts 4 and 3 of relays 338 and 340, respectively, are connected to one side of the 24 volt tap of the transformer secondary. The movable contact arm 354 of switch 352 is electrically connected to one side of the winding of the mistake counter stepping relay 348, while the other side of said winding is connected to the common return A of the transformer secondary. The rotary contact arm 354 of switch 352 rotates in a clockwise direction and must make about three-fourths of a revolution before it engages contact member 353, and it will be noted that unless the companion contacts 3, 4 of either relay 338 or relay 340 are engaged, no pulse will be sent to the stepping relay 348 of the mistake counter. The rotary contact arm 354 of switch 352 is rotated by a shaft 355 actuated by an electric motor 356. Motor 356 is operated under the control of a relay 358 which includes a winding 359, a spring retracted armature 360 pivoted at 361 and having an arm 362, which carries a movable contact member 363 in position to engage and disengage a companion stationary contact member 363a. The end of arm 362 is positioned to releasably engage a disk 364 in a notch 365 formed in said disk. Disk 364 is fixed to and is rotated by shaft 355 at the same speed as contact arm 354 of switch 352. As soon as either relay 338 or relay 340 is actuated, pursuant to the energization of the companion relay winding 341, and the normally open companion contacts 1, 2 of either of said relays are engaged, a circuit is completed through the winding 359 of relay 358, and armature 360 is attracted and is moved against the force of retracting spring 366 to a position in which arm 362 disengages disk 364 and contact 363 engages the companion contact 363a, thus releasing shaft 355 for rotation and completing a circuit through motor 356 for the operation of said motor for rotating said shaft. During the rotation of disk 364 by motor 356, the outer end of arm 362 is held resiliently in engagement with the peripheral edge of disk 364, by spring 366, so that contacts 362 and 363 are held in engagement with each other for a complete revolution of disk 364, even if in the meantime the circuit through winding 359 of relay 358 is interrupted, as it will be, if the flyer rectifies his mistake quickly enough. This permits arm 354 and disk 364 to be returned to their starting positions, illustrated in the circuit diagram, without being prevented from doing so if the flyer rectifies his mistake quickly enough, and if the mistake is rectified before arm 354 engages contact member 353 during one revolution of disk 364, no pulse will be sent to the stepping relay 348 of the mistake counter, since if the mistake is so rectified, the circuit controlled by switch 352 will be broken by the disengagement of the companion contacts 3, 4 of either relay 338 or relay 341 as the case may be.

The manner in which the relay windings 341 of the companion right mistake and left mistake relays 338 and 340, respectively, are energized, for engaging their respective normally open contacts, and for disengaging their respective normally closed contacts, will now be described. It will be noted that one side of each relay winding 341 is connected to the point A of the transformer secondary, that the other side of said winding of relay 338 is connected to the contact 3 of the right stick relay 306 and to the contact 3 of the right pedal relay 390, and that the other side of the winding 341 of left mistake relay 340 is connected to contact 3 of the left stick relay 310 and to the contact 3 of the left pedal relay 312. Considering first the right mistake relay 338, if the right stick relay is operated, thereby engaging contact 4 with the companion contact 3, and if the right pedal relay is not actuated, current is supplied from the normally closed contacts 5 and 6 of relay 308 to contacts 4, 3 of the right stick relay 306, thus completing a circuit through the winding 341 of the right mistake relay 338. On the other hand, if the right pedal relay 308 is actuated, and the right stick relay 306 is not actuated, a circuit is completed through the winding 341 of relay 338 through the contacts 3 and 4 of the actuated right pedal relay 308, contact 4 of relay 308 receiving current from the normally closed contacts 5, 6 of the non-operated right stick relay 306. It will be understood without further detailed description that the winding of the left mistake relay 340 is similarly energized when the left stick relay 310 is operated, without operation of the left pedal relay 312 or vice versa. The mistake counter 282 is provided with a resetting relay 368 controlled by the manually operable switch 370. It will be noted that the mistake counter 282 is illustrated only diagrammatically, since it is a well known device and does not per se form part of the present invention. The mistake counter 282 is illuminated by a lamp 372 controlled by a switch 374. As switches 370 and 374 are preferably mounted on the instrument panel 28, as illustrated in Fig. 1, they are shown in the circuit diagram near the instruments which are mounted on said instrument panel.

The operation of reversible motor M3 for actuating the sprocket chain 160, which moves the scene screen 32, will now be described. The operation of motor M3 is under the control of contact carrying arm 176, which is turned by shaft 78. The arrangement is such that the scene screen 32 travels in a direction opposite to the direction of turning movement of airplane-simulated part or nose 34, said screen 32 moving to the right when part 34 is turned to the left, and vice versa. The direction of rotation of motor M3 is controlled by contact members 376, 378 and 380 of contact carrying arm 176 in conjunction with contact strips 382 and 384, which are engaged by contact member 376, contact strips 386 and 388, which are engaged by contact member 378, and contact strips 390 and 392, which are engaged by contact member 380. The speed of rotation of motor M3 is controlled by movable contact member 394, which is engageable with the contact strips 396, 397, 398, 399, 400 and 401 (Fig. 4) constituting terminals of the rheostat 402. Said contact 394 of contact arm 176 is also engageable with the contact strips 403, 404, 405, 406, 407 and 408, connected in parallel with the contact strips or resistance taps 396 to 401, respectively. As shown in the circuit diagram, contact members 378 and 394, carried by arm 176, are electrically connected to each other. As indicated in Fig. 4, contact strip 382 is electrically connected to contact strip 388 by a jumper 411 at the back of plate 166, and contact strip 386 is electrically connected to contact strip 384 at the back of plate 166 by a jumper 410. It will be observed by noting Fig. 4 in comparison with the circuit diagram, that when arm 176 is in its neutral position, the screen operating motor M3 does not operate, since contact members 376, 378, 380 and 394 do not engage the companion contact strips on the front of plate 166 when arm 176 is in its neutral position, but engage insulation portions of contact carrying plate 166. It will be understood that as arm 176 is moved from its central or neutral position to the right or to the left, rotation of motor M3 takes place in directions such that the scene screen 32 is moved in directions opposite to the turning directions, respectively, of arm 176, and therefore in directions opposite to the turning movements of airplane simulated part or nose 34, since the latter is fixed to the same shaft 78 which rotates contact carrying arm 176. Also, it will be understood that as arm 176 is moved further to the right or to the left, the speed of motor M3 is increased, resistance of the rheostat 402 being progressively cut out.

The air speed indicator 278 is operated by means operable under the control of slide 40. Referring more particularly to Figs. 3, 12, 13, and 14, a speed contact plate 404a, and a control plate 406a are mounted in side by side relation in a vertical plane laterally of one of the slide-guide members 42 by means of supporting bars 407a and 408a, secured to said guide member 402 and to said plates 404a and 406a in any suitable way as by screws 409. The air speed contact plate 404a is formed of insulation and is provided with a plurality of metal contact strips, the outer surfaces of which are flush with the surface 410 of said plate. These contact strips are marked with the reference characters 40S, 50S, 60S, 70S, 80S, 90S, 100S, and 110S, which indicate more or less arbitrary speed values and are arranged in laterally spaced vertical rows (Figs. 3 and 12). Said contact strips of different speeds are insulated from each other and are connected to the corresponding speed indication lamps correspondingly marked on air speed indicator 278 in the circuit diagram of Fig. 18C. A movable contact member 412 is movable longitudinally of said contact strips in electrical engagement therewith, said movable contact member being connected to the 6 volt tap of the secondary of the transformer T, and it will be understood that the current which is supplied to said contact strips by movable contact member 412 is supplied to the air speed indicator lamps of indicator 278, said lamps being connected across companion contact strips of plate 404a and the common point A of the secondary of the transformer.

Movable contact member 412 is carried by a control bar 414, and is held resiliently in engagement with the contact strips or with surface 410 of plate 404a by a compression spring 416 (Fig. 12). Control bar 414 is connected to slide 40 by laterally spaced pins 417 and 417a which are fixed to slide 40 and engage bar 414 in a slot 418 thereof. Said control bar 414 is thus movable with slide 40 and is also movable laterally of said slide for engaging movable contact member 412 with the speed contact strips in the different vertical rows, respectively. A spring 419 connected at one end to a pin 420 carried by slide 40, and at its opposite end to a pin 421 fixed to bar 414, holds said bar resiliently against pin 417 at the adjacent end of slot 418, in which position of bar 414 movable contact member 412 carried by said bar engages the speed contact strips in the end row at the right (viewing Fig. 3). Said bar and the movable contact member 412 carried thereby are movable to the left, still viewing Fig. 3, against tension of spring 419 to positions in which said movable contact member engages the speed contact strips in the central row, and in the row at the left, respectively. This lateral movement of bar 414 takes place under the control of control plate 406a in conjunction with the vertical movement of slide 40. For this purpose, control plate 406a is provided with the laterally spaced vertical guide strips 422 and 424, which define a vertical guideway 426 therebetween. Plate 406a is also provided with vertically aligned guide strips 428 and 430 which are spaced from guide strip 424, providing a vertical guideway 432. Bar 414 is provided with a guide member 434 which is fixed thereto and is movable in said guideways 426 and 432 in engagement with the confronting side edges of strips 422 and 424 of guideway 426, and with the confronting edges of strips 424 and 430 of guideway 432.

The lower end of guideway 426 is closed by a pivoted latch 436 which, when engaged by guide member 434 of control bar 414, can turn in a clockwise direction, viewing Fig. 3, and is turned in that direction to allow said guide member 434 to move out of guideway 426, when slide 40 reaches a predetermined position near the end of its down travel. When guide member 434 passes downwardly beyond latch 436, said latch is spring projected to its closed position and prevents a return upward movement of guide member 434 in guideway 426, except under the condition which will subsequently be described, and when said latch is in its guideway-closing position, its edge 437, which is inclined upwardly toward guideway 432, is engaged by guide member 434 of control bar 414, and serves to guide said guide member 434 into guideway 432 when slide 40 is raised. It will be understood that when guide member 434 is in guideway 432, said guide member is held resiliently by spring 419 against the right hand edge of strip 424. A spring projected latch 438 permits guide member 434 to move upwardly in guideway 432 past said latch, but prevents movement of guide member 434 downwardly of guideway 432 past said latch. A spring projected latch 440 permits guide member 434 to move downwardly out of guideway 432 above latch 438 into guideway 442, at the left of control plate 406, when slide 40 is moved downwardly when guide member 434 is in guideway 432 above latch 438. A spring projected latch 443 permits guide member 434 to move upwardly out of the upper end of guideway 432, but prevents movement of said guide member 434 downwardly into guideway 432 when said guide member has travelled upwardly beyond said latch 443. When guide member 434 is moved upwardly out of guideway 432 beyond latch 443, the latter is automatically closed by its spring hinge (Fig. 13) and bar 414 is projected to the right by spring 419, until guide member 434 engages the left hand edge of strip 422 at the upper end of guideway 427 for downward movement of said guide member 434 in said guideway 426. It will be observed that the upper end of guide strip 424 is provided with an upper edge 444 which is inclined upwardly toward the upper end of guideway 426, and serves to direct guide member 434 toward said upper end of said guideway 426, when guide member 434 passes upwardly in guideway 432 beyond upper latch member 443. It will be understood that when guide member 434 is in guideway 426, the movable contact member 412, carried by control bar 414, is positioned to engage the speed contact strips in the right hand row, that when said guide member 434 is in guideway 432, movable contact member 412 is positioned to engage the speed contact strips in the center row, and that when guide member 434 is in guideway 442, said movable contact member is positioned to engage the speed contact strips in the left hand row. The lower end 445 of guide strip 430 is inclined downwardly toward the lower end of guideway 432, so that when guide member 434, travelling downwardly in guideway 442, reaches the lower end of said guideway, said guide member 434 is directed toward the lower end of guideway 432 for movement upwardly in said guideway, if slide 40 is moved upwardly. If latch 436 is open when guide member 434 travels downwardly beyond the lower end of guideway 442 and the lower end of said latch, said guide member will be moved all the way to the right for movement upwardly in guideway 426 when slide 40 is raised.

Latch members 438, 440 and 443 are movable to their respective retracted positions solely by the mechanical engagement of guide member 434 with said latch members, respectively, and are movable to their projected positions, illustrated in Fig. 3, by their respective springs 446, 447 and 448 (Fig. 13), respectively, when said latch members are released by said guide members 434. The pivot or hinge pins for latches are indicated at 446A, 447A and 448A, respectively, in Fig. 13, said pins being fixed to plate 406. Latch member 436 is also movable to its retracted position by the engagement of guide member 434 with said latch member, but in addition, provision is made for moving said latch member 436 to its retracted position by electrically controlled means to allow the movement of guide member 434 from the lower end of guideway 442 into the lower end of guideway 426. Referring now in this connection to Figs. 14, 14A and the circuit diagram Fig. 18B, latch member 436 is fixed to one end of a pivot pin 450 which is pivotally mounted for turning movement in plate 406. Said pivot pin 450 has a crank pin 451 secured thereto, and the upper end portion 452 of an armature lever 453 is secured to the outer end of crank pin 451. Armature lever 453 is pivoted as indicated at 454, and is engaged at its end 455 by a tension spring 456 which holds armature lever 453 in its retracted position in respect to an electro-magnet 457 of relay 458. It will be noted that spring 456 acts through armature lever 453, crank pin 451, and pivot pin 450 of latch member 436 to hold the latter releasably in its projected position when the winding of the electro-magnet 457 is not energized, and that said latch member can move to its retracted position against the tension of spring 456 when engaged by guide member 434 when the latter passes downwardly in guideway 426 past said latch member. As illustrated in the circuit diagram (Fig. 18B), one side of the winding of electromagnet 457 of relay 458 is connected to the stationary contact 459 of rheostat 290, which is connected to the lowest or idling speed indication of the engine-speed indicator 280. When the movable rheostat contact 292 engages contact 459, which occurs at the idling engine speed, the winding of electro-magnet 457 is energized, thus attracting armature lever 453 against the tension of spring 456 for moving latch member 436 to its retracted position for opening the lower end of guideway 426, whereby to permit guide member 434 to enter the lower end of said guideway. Thus, it will be understood that when the motor speed is too low to permit the plane to "fly," the air speed of the plane as indicated by air speed indicator 278 should be correspondingly low, and for this purpose it is necessary to allow the movable contact member 412 to engage the contact strips in the right hand row, (viewing Fig. 3), of the air speed contact plate 404. Accordingly, when latch member 436 is moved to its retracted position under the control of relay 458, contact member 412 engages the contact strip 70S in said right hand row, and then as slide 40 is moved upwardly, said movable contact member 412 successively engages the contact strips 60S, 50S, and 40S in said right hand row of contacts.

It will be noted that the contact strips in the right hand row and the center row, namely the contact strips for the air speeds of 40 to 90 miles per hour, are connected directly to the corresponding indicator lamps on the air speed indicator 278, while the speed contact strips in the left hand row, namely the contact strips for the air speeds of 100 and 110 miles per hour, are connected to the corresponding lamp indicators of air speed indicator 278, through normally closed contacts 7, 8 and 3, 4 of relay 458, so that air speeds of 100 or 110 miles per hour can be indicated on the air speed indicator only when magnet 457 is deenergized, the arrangement being such that when armature 453 is attracted by the magnet, when the latter is energized at the idling motor speed, the companion contacts 7, 8 and 3, 4 are disengaged for interrupting the circuit through the corresponding indicator lamps 100 and 110 of indicator 278. Further, it will be observed that strip 90S of contact plate 404, besides being connected directly to the corresponding lamp indicator of air speed indicator 278, is connected to the normally open contacts 1 and 5 of relay 458. When magnet 457 is energized, companion contacts 5 and 6 are engaged and companion contacts 1 and 2 are engaged, thus connecting air speed contact strip 90S to air speed contact strips 100 and 110, respectively, so that in case movable contact member 412 is in electrical contact with either strip 100S or 110S at the time when magnet 457 is energized, current will be supplied to air speed contact strip 90S and from the latter to the corresponding lamp indicator. The reason for this last mentioned arrangement is that the air speed, as shown by indicator 278, should not be higher than 90 miles per hour when a landing is being made, although the guide member 434 has not been moved to a position in which contact member 412 engages the 90S contact strip on contact plate 404.

The operation of the air speed control device will now be more fully explained. Assuming that the engine speed is sufficiently high, in which case contact 459 of rheostat 290 does not receive any current and magnet 457 is therefore de-energized, latch member 436, as well as the other latch members, are in their projected positions. At the start of the operation, preliminary to taking off, slide 40 is in its uppermost position and contact member 412 is above the 40S contact, so that there is no air speed indication on indicator 278. The pilot then operates the stick 24 for rotating motor M1 in such direction as to lower slide 40, and as slide 40 descends, contact 412 moves downwardly and successively engages the contact strips in the right hand row of contacts, viewing Fig. 3. When slide 40 approaches its lowermost position, as indicated by the shadow of part 34 on screen 32, guide member 434 moves past latch 436, and if now the control stick is moved in the opposite direction for effecting rotation of motor M1 in a direction to move slide 40 upwardly, guide member 434 passes upwardly into guideway 432. When guide member 434 is moved into guideway 432, contact member 412 engages the lowest contact strip of the center row of contact strips, namely the 80S contact, and thereafter as the slide 40 continues to move upwardly said contact member 412 engages the 90S contact strip. However, if slide 40 moves too high, contact member 412 will engage the upper 80S contact strip of the center row, whereby the indicator will register a loss of air speed simulating the effect of a too rapid climb of the airplane, and if further upward movement of slide 40 occurs, guide member 434 will move past latch member 443 upwardly out of guide 432, and thereupon spring 419 will move control arm 414 to the right (viewing Fig. 3) in which position movable contact member 412 will engage the 40S contact strip, or the insulation plate 404 above said contact strip, as the case may be, indicating very low or no air speed. In this case, in order to gain air speed, slide 40 must be lowered, and if a speed indication higher than 80 miles per hour is desired, said slide must be lowered to a point at which guide member 434 is moved past latch member 436 to a position therebelow in order to effect a lateral movement of contact member 412 into engagement with the contact strip 90S upon upward movement of said slide, during which upward movement guide member 434 travels upwardly in guideway 432. Said guide member 434 can move upwardly in guideway 432 to a point between latches 438 and 443 without the above described return of contact member 412 to the right, but if a higher speed indication than that obtainable with contact member 412 in the center row of contacts of plate 404 is desired, it is necessary to lower slide 40 from a point between said latches 440 and 443 in guideway 432, whereby to cause guide member 434 to pass from guideway 432 into guideway 442 past latch 443, the slide being lowered sufficiently to move guide member 434 downwardly in guideway 442 to permit latch member 440 to be moved by its spring to the projected or closed position thereof. When guide member 434 is moved downwardly in guideway 442 to a point where said guide member is positioned below the lower end of latch member 440, contact member 412 is in engagement with 110S contact strip, which is the maximum air speed indication provided for in this apparatus. Assuming that it is desired to make a landing of the airplane while the guide member 434 is in guideway 432, so that an air speed indication of either 100 miles per hour, or 110 miles per hour, as the case may be, is displayed on air speed indicator 278, lowering of the engine speed to 500 R. P. M. will result in the energization of winding 457 of relay 458, as explained above, for disconnecting the 100S and 110S strips from the air speed indicator 278, by disengaging contacts 7, 8 and 3, 4 of said relay, and for connecting the 90S contact strip to the 110S and 100S contact strips, and to the 90S indicator lamp so that a suitable landing speed may be displayed by indicator 278. In making a landing, slide 40 is first lowered so that guide member 434 moves out of the lower end of guideway 442 to a point at which spring 419 of control bar 414 is effective to move said guide member 434 to the right to a position below guideway 426 and clear of latch 436. Since latch 436 is moved to its retracted or open position when the winding of relay 458 is energized, as explained above, it is now possible to move guide member 434 upwardly in guideway 426, at which time contact member 412 is engaged successively with the contact strips in a speed decreasing direction, so that gradually decreasing air speeds are displayed on indicator 278 in simulation of the lowering of the air speed of an airplane while landing. It will be observed that since the raising and lowering of slide 40 is controlled by the airplane control member or stick 24, and that since the slide is raised by the operation of motor M1, when the stick is moved toward the pilot, and is lowered by the operation of motor M1 in the reverse direction when stick 24 is moved in a direction away from the pilot, the air speed indications displayed on indicator 278 can be made to simulate closely the taking off, flying, and landing operations of an airplane, pursuant to proper manipulations of stick 24.

As indicated earlier in this specification, provision is made for operating the up and down switches 210 and 212 and the right turn and left turn switches 214 and 216 by a wheel control instead of by the stick 24. For this purpose the stick 24 is, as described above, removable from the upwardly projecting stud 197 of ball 186 of the universal joint 184 and is replaceable by a part of the wheel control device which will now be described with more particular reference to Figs. 15 to 17. Referring to these last mentioned figures, the wheel control device comprises a rod 470 which is operated by the wheel 472. Said rod is provided at its lower end with a socket 473 which fits removably over stud 197 of ball 186 of the universal joint. Said rod 470 is operatively connected to wheel 472 by a crank shaft 474. Said crank shaft 474 has an upper crank arm 475 which engages rod 470 in the upper forked end 476 thereof, it being understood that when wheel 472 is turned either to the right or to the left, the rod 470 is effective to operate the right and left turn switches 214 and 216, respectively, in the same way as these switches are operated by stick 24. Crank arm 475 of shaft 474 is held against movement transversely of rod 470 in any suitable way, here shown as by a washer 477, and a pin 478 fixed to crank arm 475 and positioned at opposite sides, respectively, of forked end 476 of said rod. The lower crank arm 475a of shaft 474 extends through an opening 479 near the upper end of a post 480 and is journalled for turning movement in a bearing member 481 fixed to the upper end of said post in any suitable way as by screws 482. The end of lower crank arm 478 extends through a collar 483 and is keyed against turning movement in relation to said collar by a cross pin 484. Said collar is secured to wheel 472 in any suitable way as by screws 485. A collar 486 is secured to crank arm 478 by a cross pin 487 and together with bearing member 481 and collar 483 holds said crank arm against movement longitudinally of opening 479 of post 480. The lower end of post 480 is removably received in a socket member 488 secured to floor 18 by a hinge 489 so that post 480, being thus mounted for pivotal movement, can be moved toward and away from the pilot for actuating rod 470 whereby to operate the up and down switches 210 and 212. Post 480 is movable only toward and away from the pilot, and it will be understood that when wheel 472 is moved toward and away from the pilot, corresponding motions are imparted to rod 470 through crank shaft 474, and it will also be understood that in any position of post 480 radially of the horizontal pivotal axis of hinge 489, wheel 472 can be turned for actuating rod 470 through crank shaft 474, whereby to operate either the right turn switch 214 or the left turn switch 216. Further it will be understood that when wheel 472 is released, spring 200 which engages the lower stud 198 carried by ball 186 will return rod 470 and post 480 to the normal, or neutral vertical positions thereof. Provision is also made for holding wheel 472 resiliently in its normally neutral position and to return said wheel to said position when it is released following the turning thereof in either direction. For this purpose spring members 490 are positioned at opposite sides of crank shaft 474 and resiliently engage at their upper ends the intermediate part 491 of said crank shaft. The lower ends of springs 490 are secured to arms 492 in any suitable way as by screws 493. Said arms 492 are in fixed relation and extend transversely of standard 480 being for this purpose secured to the adjacent ends of a bracket 494 secured to standard 480. Bracket 494 is secured to standard 480 in any suitable way as by screws 495, and to arms 492 in any suitable way as by screws 496. A stop pin 497 is secured to wheel 472 in fixed relation thereto and projects forwardly into the space between arms 492, being positioned centrally of said arms in the neutral position of wheel 472 so that when said wheel is turned in either direction, pin 497 engages one or the other of arms 492 and thereby limits the extent of turning movement of said wheel in either direction. It will be understood that the wheel control is removable by disengaging post 480 from hinged socket 488 and by moving forked rod 470 from stud 197. As described above, Fig. 2 shows the wheel control device removed and the stick control 24 applied to the stud 197 for operating the control switches 210, 212, 214 and 216. As crank shaft 474 is removable from the forked end of rod 470, the top of said forked end being open, as shown in Fig. 15, it is possible to remove post 480 from socket 488 without removing rod 470 from stud 197 whereby said rod can be utilized as a stick control in lieu of stick 24 for actuating the switches directly, if so desired.

*Summary of operation.*—The operation of the apparatus is believed to be clear from the above description of the construction of the apparatus and of the operation of the several parts thereof. However, by way of a general summary of the operation of the apparatus as a whole, it may be noted as follows:

The apparatus is connected to the source of current supply through main lines L1 and L2 by closing either the continuous operation switch 270 or the timer control switch 265. Then the throttle switch 272 is operated for actuating the noise motor 286, simulating the operation of the airplane motor, at the proper speed for a take off. This speed is indicated on the motor speed indicator 280, which is energized under the control of arm 292 which is moved over the stationary contacts of rheostat 290 simultaneously with the movement of throttle switch 282 of rheostat 288, so that as the speed of the noise motor is increased, higher speeds are displayed on the motor speed indicator 280. When a motor speed suitable for taking off is indicated, stick 24 is operated in simulation of the operation of an actual control stick of an airplane for taking off. At the start of the taking off operation, slide 40 is in its uppermost position, and is caused to move downwardly by the operation of motor M1 which is caused to rotate in the proper direction by the closing of the stick controlled down switch 212, resulting in the operation of the down relay 298 which thereupon connects motor M1 to the current supply for said operation of the motor. During this time, the screen 32 is stationary and the shadow of the nose or airplane-simulated part 34 on said screen moves downwardly, and at the same time, the air speed indications are displayed on indicator 278 in the manner described above in the operation of control bar 414 by control plate 406. When the proper air speed is displayed by the air speed indicator 278, stick 24 is moved toward the pilot for closing up switch 210 for effecting the operation of motor M1 through the up relay 296 in a direction to result in the raising of slide 40, and of the shadow of nose 34 on screen 32. During this last mentioned operation, the pilot watches the air speed indicator and the shadow of nose 34 on the screen, taking care not to permit nose 34 to move too high on the screen, following an indication of decrease of air speed, which occurs when contact member 412 passes upwardly from the 90S contact strip to the 80S contact strip. In other words, when the speed indication changes from 90 miles per hour to 80 miles per hour, while the shadow of part 34 is ascending on screen 32, the pilot operates stick 24 to disconnect motor M1 from the line through the up relay 296. When the pilot wishes to turn the plane, i. e., the simulated airplane part 34, either to the right or to the left, he moves stick 24 in the corresponding direction to close either the right stick switch 241 or the left stick switch 216, thereby to connect motor M2 to the line through either the right stick relay 306 or through the left stick relay 310, provided, however, that the pilot has also operated the correct rudder simulated pedal 26 for closing the right pedal switch 264 or the left pedal switch 262, depending upon the direction of the turn, these last mentioned switches controlling the operations of the right pedal relay 308 and the left pedal relay 312, respectively, as described above. In other words, in order to turn an airplane in the air to the right or to the left, it would be necessary to operate the stick control and the rudder control substantially simultaneously, and correspondingly in simulation of the correct manipulations of these airplane controls, the present apparatus provides for the simultaneous operation of the stick 24 and of the proper simulated rudder-controlled pedal in order to operate motor M2 for turning nose 34. Further, it will be noted, that stick 24 is operable not only to control switches 210, 212, 214 and 216, individually and independently of each other, but that said stick is also operable on its universal joint 184 whereby the up switch can be closed simultaneously with the closing of either the right switch or the left switch for causing the airplane to climb and turn at the same time in the desired direction, or whereby said stick 24 can be operated to close the down switch and simultaneously with the closing of either the right switch or the left switch for causing the airplane to descend to a lower altitude, and simultaneously to make a turn in the desired direction. It will be understood, however, that whenever the right stick switch or the left stick switch is closed, regardless of whether or not the up or down switch is closed, it is necessary to operate the correct simulated rudder controlled pedal 26.

In order to provide a proper realistic effect simulating the flying of an airplane, screen 32 is caused to travel in the proper direction with respect to the direction of the turning of nose 34, said screen moving in a direction opposite to the direction of turn of the nose. This result is accomplished by connecting the scene operating motor M3 for the rotation thereof in the proper direction under the control of contact carrying arm 176 in conjunction with the proper contact strips on contact plate 166, as explained above. Since contact carrying arm 176 is turned by shaft 78 from its neutral position either to the right or to the left, only when nose 34 is turned by shaft 78 from a straight ahead flying position, the screen operating motor M3 will not be operated unless motor M2 is operated for turning nose 34, pursuant to the correct manipulations of both stick 24 and the proper simulated rudder controlling pedal 26. It will be noted also that the speed of the scene motor M3 is varied pursuant to the turning movement of arm 176, the speed of said motor, and therefore the speed of screen 32 relative to nose 34, increasing with the degree of turn of said nose 34, thereby improving the realistic effect of the turning movement of nose 34, and more closely simulating actual flying of an airplane under similar conditions.

As described above, a mistake in the operation of the stick 24 and the pedals 26 for resulting in the turning of nose 34 will be indicated instantaneously by the warning lights or signals 344 and 345, as the case may be, depending upon the direction of turn in connection with which the mistake is made, and if the mistake is not corrected soon enough, say within three seconds or so, it will be registered on the mistake counter 282, which operates under the control of the mistake delay timer 350 as hereinbefore explained. After the student pilot has manipulated stick 24 and simulated rudder controlling pedals 26 for taking off, and for maneuvering the plane in the air, stick 24 may be operated for landing the airplane. For this purpose, the flyer moves stick 24 in a direction away from him, that is to the left, viewing Fig. 2, thereby closing the down switch 212 for operating the down relay 298, and simultaneously energizing the proper landing air speed lamp or signal on the air speed indicator 278 as explained above, the final landing operation and simulation of such operation in landing an actual airplane being to move the stick 24 toward the pilot, thereby closing the up switch 210 and operating the up relay 296, for causing motor M1 to move the slide 40 upwardly, it being understood that during the landing operation, the throttle switch 272 will be actuated to decrease the speed of the noise motor 286, and simultaneously bringing contact arm 292 in engagement with the idling speed contact 459 of rheostat 290, thereby energizing the winding 457 of relay 458, so that when stick 24 is properly manipulated for landing the plane, the guide member 434 will be disposed in guideway 426 of speed indicator control plate 406, and so that upon the final upward movement of slide 40, contact 412 will be positioned above the 40S contact strip, no air speed indication being displayed on the air speed indicator 278 when the simulated airplane part 34 is in its "grounded" position.

In the above summarized explanation of the operation of the apparatus, it was assumed that the switch 268 was closed, whereby the light 126 which turns with shaft 78 was illuminated for casting a shadow of nose 34 on screen 32, in which case a representation of part 34 on screen 32 is visible to the pilot in cockpit 12, since said screen is translucent as described above. It will be understood, however, that the present apparatus may be used under simulated blind flying conditions when switch 268 is opened, so that lamp 126 is not illuminated, there being in such case no representation of nose 34 on screen 32. Under these conditions the flyer, while operating the control members 24 and 26 as described above, must rely upon his instruments and more particularly upon the climb and descent indicator 274, and upon the signals 317 to 322, inclusive of the turn indicator 276, as well as upon the air speed indicator 278. It will be noted that the apparatus will operate under simulated blind flying conditions in the same way as under visible flying conditions except that, as stated, the movement of nose 34 in respect to screen 32, pursuant to the operation of control members 24 and 26, will not be visible to the pilot.

While I have shown and described the preferred embodiment of my invention, it will be understood that the latter may be embodied otherwise than as herein specifically illustrated or described, and that in the illustrated embodiment certain changes in the details of construction and in the arrangement of parts may be made and certain parts may be omitted, without departing from the invention as defined by the scope of the appended claims. It will be understood that stick 24, the wheel control device, which includes rod 470 and wheel 472, and pedals 26 simulate the corresponding flight-control members or means of an airplane and that as used in the claims the expression "flight-control" denotes said simulated flight-control members or means or the equivalent thereof.

Having thus described my invention, what I claim and desire to secure by Letters Patent is:

1. In apparatus of the kind described, a simulated airplane nose, means mounting said nose for rectilinear and curvilinear movement thereof, a translucent screen positioned in front of said simulated airplane nose, a plurality of simulated flight-control members positioned in front of said screen, one of said flight-control members being hand operable and another of said flight-control members being foot operable, electro-motive means operatively connected to said simulated airplane nose for moving the same rectilinearly, electro-motive means operatively connected to said nose for moving the same curvilinearly, means operable under the control of one of said simulated flight-control members for controlling the operation of said first-mentioned electro-motive means, and means operable only under the joint control of said plurality of simulated flight-control members for controlling the operation of said other electro-motive means for moving said nose curvilinearly.

2. Apparatus of the character described comprising a movable translucent screen, a simulated airplane nose mounted for movement behind said screen, means for casting a shadow of said nose on said screen, electro-motive means, means actuated by said electro-motive means for moving said nose whereby to cause the shadow thereof to move on said screen, means operatively connected to said screen for moving the same in relation to said nose, electro-motive means for actuating said screen-moving means, and simulated flight-control means operable at the front of said screen for controlling the operation of said first mentioned electro-motive means, a reversing switch for said last mentioned electro-motive means, and means operated by said first mentioned electro-motive means for actuating said reversing switch.

3. In apparatus of the character described comprising a simulated airplane nose mounted for turning movement, an electric motor, means operable by said motor and operatively connected to said nose for turning the same, a plurality of separate simulated flight-control members, one of said flight-control members being hand operable and another of said flight-control members being foot operable, a plurality of electric switches operable by said control members, respectively, a plurality of relays each having companion contacts, means including said contacts of all of said relays for connecting said motor to and disconnecting the same from a source of operating current, each of said relays having an electro-magnet for operating the same, and means connecting said magnets and said switches in series whereby said relays are operable only under the joint control of said plurality of simulated flight-control members.

4. In apparatus of the character described comprising a simulated airplane nose mounted for turning movement, an electric motor, means operable by said motor and operatively connected to said nose for turning the same, a plurality of separate simulated flight-control members, one of said flight-control members being hand operable and another of said flight-control members being foot operable, a plurality of electric switches operable by said control members, respectively, a plurality of relays each having companion contacts, means including said contacts of all of said relays for connecting said motor to and disconnecting the same from a source of operating current, each of said relays having an electro-magnet for operating the same, means connecting said magnets and said switches in series whereby said relays are operable only under the joint control of said plurality of control members, and means operable under the control of said nose-turning member for indicating the movement of said nose.

5. In a grounded flight training apparatus of the character described, a member mounted for rectilinear movement in two directions and also for turning movement in two directions, means for moving said member rectilinearly in either of said directions and for turning said member in either of said directions, means for predetermining the directions of rectilinear and turning movements, respectively, of said member, means operable under the control of said last mentioned means for indicating the directions of the rectilinear movement and of the turning movement of said member, a translucent screen mounted for movement in front of said members, and means operable under the control of said member, when the latter is turned from a predetermined position, for controlling the speed of travel of said screen.

6. In a grounded flight training apparatus of the character described, a member mounted for rectilinear movement in two directions and also for turning movement in two directions, means for moving said member rectilinearly in either of said directions, means for turning said member in either of said directions, means including a manually operable simulated flight-control member for predetermining the direction of rectilinear movement of said member by said first mentioned moving means, a separate foot operable simulated flight-control member, and means operable under the joint control of said simulated flight-control members for controlling the operation of said turning means, said jointly controlled means including means to prevent operation of said turning means unless both of said simulated flight-control members are operated concurrently.

7. In apparatus of the kind described, a simulated airplane nose mounted for movement in two directions, an electric motor, means actuated by said electric motor for moving said nose in either of said directions, a translucent screen mounted in front of said nose for movement in two directions opposite, respectively, to the directions of movement of said nose, means for moving said screen in either of said directions, and means operable under the control of said nose-moving means for controlling the operation of said screen moving means whereby to move said screen in a direction opposite to the direction of movement of said nose.

8. In apparatus of the kind described, a simulated airplane nose mounted for movement in two directions, an electric motor, means actuated by said electric motor for moving said nose in either of said directions, a screen mounted for movement in two directions opposite, respectively, to the directions of movement of said nose, a reversible electric motor, means actuated by said reversible electric motor for moving said screen in either of said directions, a reversing switch operatively connected to said reversible motor for controlling the direction of rotation thereof, means operated under the control of said nose-moving means for actuating said reversing switch, and means operatively connected to said reversible motor and operable under the control of said nose-moving means for varying the speed of said reversible motor.

9. In apparatus of the kind described, a member mounted for sliding movement in two directions, a shaft movable with said member and also mounted for turning movement in two directions, a reversible electric motor operatively connected to said slidable member for moving the same in either of said two directions, a reversible electric motor movable with said slidable member and operatively connected to said shaft for turning the latter in either of said directions, a simulated airplane nose turnable by said shaft, a contact carrying arm turnable by said shaft, a stationary contact carrying plate positioned for the engagements of the contacts thereof by the contacts of said arm, a translucent screen movable in front of said nose in two directions, an electric lamp positioned in back of said nose for casting a shadow of said nose on said screen, said lamp being turnable with said shaft and connectable to a source of current through companion contacts of said arm and plate, a reversible electric motor operatively connected to said screen for moving the same in either of said directions and adapted to be electrically connected to a source of current through companion contacts of said plate and arm, and means operatively connected to said first two motors, respectively, for controlling their respective directions of rotation, said last mentioned means including manually operable means positioned in front of said screen.

10. In apparatus of the kind described, a simulated airplane nose, means mounting said nose for movement, means for moving said nose, an electrically operated indicator provided with air-speed indicating means, means operable in accordance with movements of said nose for operating said indicator, a simulated airplane motor including a variable-speed noise maker, means for varying the speed of said noise maker to simulate the noises of an airplane motor as the speed thereof is varied, and means operable under the control of said last mentioned means for preventing said air-speed indicator means from indicating an air speed above a predetermined rate when the speed of said noise maker is below a predetermined rate.

11. In apparatus of the kind described, a simulated airplane nose, means carrying said nose and mounted for turning movement for turning said nose, a reversible electric motor operatively connected to said nose-carrying means to turn the latter and the nose carried thereby in either of two directions, a plurality of simulated flight-control members mounted for operative movement independently of each other, a plurality of electric switches operable under the control of said flight-control members, respectively, and means connected to said switches and to said motor for controlling the direction of motion of said reversible motor, said last mentioned means including means to prevent operation of said motor unless certain of said independently operable flight-control members are simultaneously operated in predetermined relation.

12. In apparatus of the kind described, a simulated airplane nose, means carrying said nose and mounted for turning movement for turning said nose, a reversible electric motor operatively connected to said nose-carrying means to turn the latter and the nose carried thereby in either of two directions, a hand-operated simulated flight-control member mounted for operative movement in a plurality of different directions, pedal operated simulated flight-control means mounted for operative movement in a plurality of different directions independently of said hand-operated control member, a plurality of switches selectively operable under the control of said hand-operated member in response to the operative movement thereof in different directions, respectively, a plurality of switches selectively operable by said pedal-operated means in response to the operative movement thereof in different directions, respectively, and means connecting said switches to said motor for controlling the direction of motion thereof and for preventing operation of said motor unless said first-mentioned switches are selectively operated by said hand-operated member simultaneously with and in predetermined relation to the selective operation of said other switches by said pedal-controlled means.

13. In apparatus of the character described wherein a shadow of a simulated airplane nose is cast on a movable translucent screen at the back thereof and is visible at the front of said screen, said nose being mounted for movement behind said screen, means for moving said nose, means for moving said screen, a reversible electric motor for operating said nose-moving means, simulated flight-control means at the front of said screen for controlling the operation of said electric motor, a reversible electric motor for operating said screen-moving means, and means operable under the control of said nose moving means for controlling the operation of said last mentioned motor.

14. In apparatus of the character described wherein a shadow of a simulated airplane nose is cast on a movable translucent screen at the back thereof and is visible at the front of said screen, a vertical guide frame behind said screen, a member mounted for vertical movement in said frame, a rotary shaft carried by said member and movable therewith, means for supporting said nose on said shaft for vertical movement therewith and for turning movement thereby, means for moving said member vertically in said guide frame, and an electric motor movable with said member and operatively connected to said shaft for turning the same.

15. In apparatus of the character described wherein a shadow of a simulated airplane nose is cast on a movable translucent screen at the back thereof and is visible at the front of said screen, a vertical guide frame behind said screen, a member mounted for vertical movement in said frame, a rotary shaft carried by said member and movable therewith, means for supporting said nose on said shaft for vertical movement therewith and for turning movement thereby, means for moving said member vertically in said guide frame, and an electric motor movable with said member and operatively connected to said shaft for turning the same, simulated flight-control means in front of said screen, and means operable under the control of said flight-control means for controlling the operation of said motor.

16. In apparatus of the character described wherein a shadow of a simulated airplane nose is cast on a movable translucent screen at the back thereof and is visible at the front of said screen, a vertical guide frame behind said screen, a member mounted for vertical movement in said frame, a rotary shaft carried by said member and movable therewith, means for supporting said nose on said shaft for vertical movement therewith and for turning movement thereby, means including an electric motor for moving said member vertically in said frame, an electric motor movable with said member and operatively connected to said shaft for turning the same, simulated flight-control means in front of said screen, and means operable under the control of said flight-control means for controlling said motors.

BEN HERTZ.

REFERENCES CITED

The following references are of record in the file of this patent:

UNITED STATES PATENTS

| Number | Name | Date |
| --- | --- | --- |
| 1,393,456 | Ruggles | Oct. 11, 1921 |
| 1,564,138 | Rowland | Dec. 1, 1925 |
| 1,825,462 | Link | Sept. 29, 1931 |
| 2,099,857 | Link | Nov. 23, 1937 |
| 2,164,412 | Koster | July 4, 1939 |
| 2,301,685 | De Florez | Nov. 10, 1942 |
| 2,307,840 | McDonald | Jan. 12, 1943 |
| 2,312,370 | Soule | Mar. 2, 1943 |
| 2,326,764 | Crane | Aug. 17, 1943 |

FOREIGN PATENTS

| Number | Country | Date |
| --- | --- | --- |
| 852,687 | France | 1939 |

OTHER REFERENCES

S. A. E. Journal, vol. 49, No. 6, page 527 (December 1941).